(12) United States Patent
Gorzkiewicz

(10) Patent No.: US 9,588,860 B2
(45) Date of Patent: Mar. 7, 2017

(54) SYSTEMS AND METHODS FOR RANDOM NUMBER GENERATION USING A FRACTIONAL RATE CLOCK

(71) Applicant: Semtech Canada Corporation, Burlington (CA)

(72) Inventor: Dariusz Gorzkiewicz, Oakville (CA)

(73) Assignee: Semtech Canada Corporation (CA)

( * ) Notice: Subject to any disclaimer, the term of this patent is extended or adjusted under 35 U.S.C. 154(b) by 209 days.

(21) Appl. No.: 14/577,372

(22) Filed: Dec. 19, 2014

(65) Prior Publication Data
US 2015/0186235 A1    Jul. 2, 2015

Related U.S. Application Data

(60) Provisional application No. 61/920,847, filed on Dec. 26, 2013.

(51) Int. Cl.
*G06F 7/58* (2006.01)
*G06F 11/263* (2006.01)

(52) U.S. Cl.
CPC ................... *G06F 11/263* (2013.01)

(58) Field of Classification Search
None
See application file for complete search history.

(56) References Cited

U.S. PATENT DOCUMENTS

| | | | | |
|---|---|---|---|---|
| 2001/0055155 A1* | 12/2001 | Kanai | ............... | G02B 27/646 359/557 |
| 2002/0016806 A1* | 2/2002 | Rajski | ............... | G06F 7/584 708/252 |
| 2002/0174152 A1* | 11/2002 | Terasawa | ............ | H04B 1/7075 708/250 |
| 2015/0186235 A1* | 7/2015 | Gorzkiewicz | ......... | G06F 11/263 714/33 |
| 2015/0268933 A1* | 9/2015 | Rivoir | ................. | G06F 7/584 708/250 |

\* cited by examiner

*Primary Examiner* — David H Malzahn
(74) *Attorney, Agent, or Firm* — Jones Day

(57) ABSTRACT

Systems and methods are provided for generating a pseudo-random bit sequence at an output frequency using a clock signal operating at a first frequency that is lower than the output frequency. A first bit sequence of a particular type is generated using a clock signal operating at a first frequency. A second bit sequence is generated using the clock signal operating at the first frequency, where the second bit sequence is a delayed version of the first bit sequence. A delayed version of the first bit sequence is generated using the second bit sequence and another bit sequence, wherein the delayed version is delayed based on the particular type and a difference between the output frequency and the first frequency. The first bit sequence and the delayed version are combined to generate a pseudo-random bit sequence at the output frequency.

20 Claims, 35 Drawing Sheets

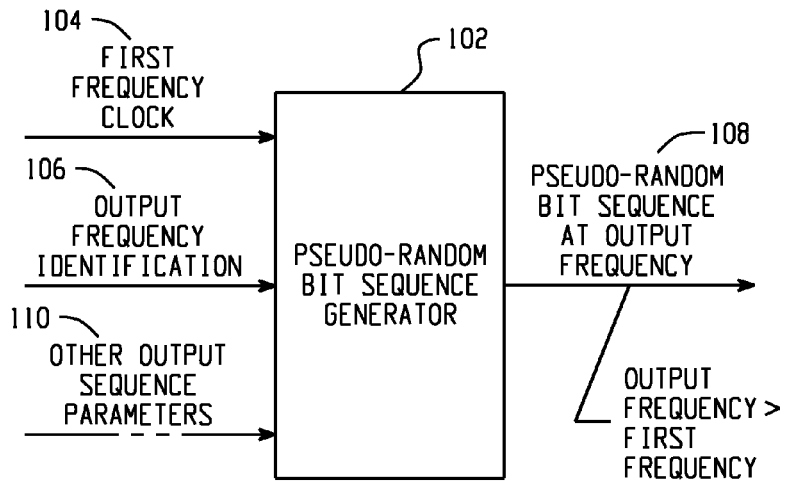
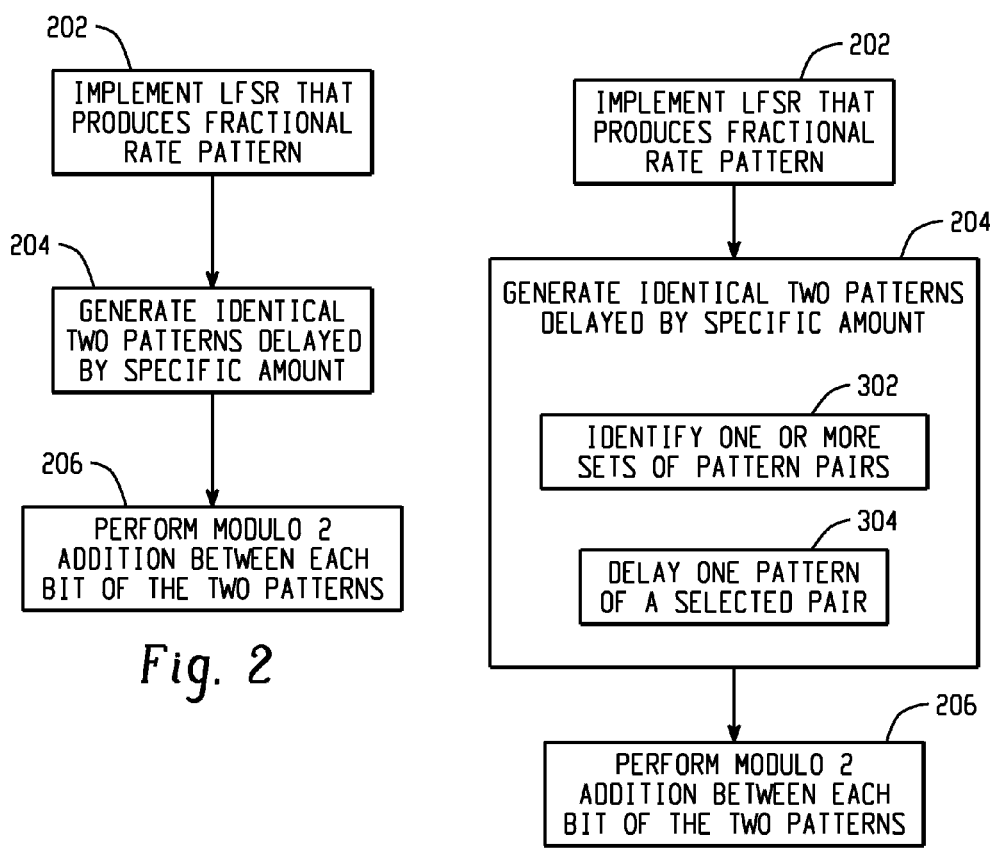
Fig. 1
Fig. 2
Fig. 3

| DEFINITION | ACRONYM | LEVEL "L" | FULL RATE DIVISOR $2^L$ | NUMERICAL EXAMPLE |
|---|---|---|---|---|
| FULL RATE | FR | 0 | 1 | 10 Gb/s |
| HALF RATE | HR | 1 | 2 | 5 Gb/s |
| QUARTER RATE | QR | 2 | 4 | 2.5 Gb/s |
| EIGHTH RATE | ER | 3 | 8 | 1.25 Gb/s |
| SIXTEENTH RATE | SR | 4 | 16 | 0.625 Gb/s |
| ⋯ | ⋯ | ⋯ | ⋯ | ⋯ |

|  | PRBS3 | |
|---|---|---|
|  | $y[n] = y[n-3] + y[n-2]$ | |
| TIME [full rate UI] | Full Rate | Half Rate |
| 1 | 1 | 1 |
| 2 | 1 | 1 |
| 3 | 1 | 1 |
| 4 | 0 | 1 |
| 5 | 0 | 1 |
| 6 | 1 | 1 |
| 7 | 0 | 0 |
| 8 |  | 0 |
| 9 |  | 0 |
| 10 |  | 0 |
| 11 |  | 1 |
| 12 |  | 1 |
| 13 |  | 0 |
| 14 |  | 0 |

*Fig. 6*

| PRBS3 PATTERN GENERATION |||||||
|---|---|---|---|---|---|---|
| STEP 1 ||| | STEP 2A |||
| AVAILABLE OUTPUTS FROM HALF RATE PATTERN GENERATOR ||| | ||||
| TIME [ps] | OUTPUT OF DFF0 | OUTPUT OF DFF1 | OUTPUT OF DFF2 | DFF0 XOR DFF1 | DFF0 XOR DFF2 | DFF1 XOR DFF2 |
| 100 | 1 | | | | | |
| 200 | 1 | | | | | |
| 300 | 0 | 1 | | | | |
| 400 | 0 | 1 | | | | |
| 500 | 0 | 0 | 1 | 0 | 1 | 1 |
| 600 | 0 | 0 | 1 | 0 | 1 | 1 |
| 700 | 1 | 0 | 0 | 1 | 1 | 0 |
| 800 | 1 | 0 | 0 | 1 | 1 | 0 |
| 900 | 0 | 1 | 0 | 1 | 0 | 1 |
| 1000 | 0 | 1 | 0 | 1 | 0 | 1 |
| 1100 | 1 | 0 | 1 | 1 | 0 | 1 |
| 1200 | 1 | 0 | 1 | 1 | 0 | 1 |
| 1300 | 1 | 1 | 0 | 0 | 1 | 1 |
| 1400 | 1 | 1 | 0 | 0 | 1 | 1 |
| 1500 | 1 | 1 | 1 | 0 | 0 | 0 |
| 1600 | 1 | 1 | 1 | 0 | 0 | 0 |
| 1700 | 0 | 1 | 1 | 1 | 1 | 0 |
| 1800 | 0 | 1 | 1 | 1 | 1 | 0 |
| 1900 | 0 | 0 | 1 | 0 | 1 | 1 |
| 2000 | 0 | 0 | 1 | 0 | 1 | 1 |
| 2100 | 1 | 0 | 0 | 1 | 1 | 0 |
| 2200 | 1 | 0 | 0 | 1 | 1 | 0 |
| 2300 | 0 | 1 | 0 | 1 | 0 | 1 |
| 2400 | 0 | 1 | 0 | 1 | 0 | 1 |
| 2500 | 1 | 0 | 1 | 1 | 0 | 1 |
| 2600 | 1 | 0 | 1 | 1 | 0 | 1 |
| 2700 | 1 | 1 | 0 | 0 | 1 | 1 |
| 2800 | 1 | 1 | 0 | 0 | 1 | 1 |
| 2900 | 1 | 1 | 1 | 0 | 0 | 0 |
| 3000 | 1 | 1 | 1 | 0 | 0 | 0 |
| 3100 | 0 | 1 | 1 | 1 | 1 | 0 |
| 3200 | 0 | 1 | 1 | 1 | 1 | 0 |
| 3300 | 0 | 0 | 1 | 0 | 1 | 1 |
| 3400 | 0 | 0 | 1 | 0 | 1 | 1 |
| 3500 | 1 | 0 | 0 | 1 | 1 | 0 |
| 3600 | 1 | 0 | 0 | 1 | 1 | 0 |
| 3700 | 0 | 1 | 0 | 1 | 0 | 1 |
| 3800 | 0 | 1 | 0 | 1 | 0 | 1 |
| 3900 | 1 | 0 | 1 | 1 | 0 | 1 |
| 4000 | 1 | 0 | 1 | 1 | 0 | 1 |
| 4100 | 1 | 1 | 0 | 0 | 1 | 1 |
| 4200 | 1 | 1 | 0 | 0 | 1 | 1 |

Fig. 7

| PRBS3 PATTERN GENERATION ||||||||
|---|---|---|---|---|---|---|---|
| STEP 1 |||| | STEP 2A |||
| AVAILABLE OUTPUTS FROM HALF RATE PATTERN GENERATOR |||| | ||||
| TIME [full rate UI] | OUTPUT OF DFF0 | OUTPUT OF DFF1 | OUTPUT OF DFF2 | | DFF0 XOR DFF1 | DFF0 XOR DFF2 | DFF1 XOR DFF2 |
| 1 | 1 | | | | | | |
| 2 | 1 | | | | | | |
| 3 | 0 | 1 | | | | | |
| 4 | 0 | 1 | | | | | |
| 5 | 0 | 0 | 1 | | 0 | 1 | 1 |
| 6 | 0 | 0 | 1 | | 0 | 1 | 1 |
| 7 | 1 | 0 | 0 | | 1 | 1 | 0 |
| 8 | 1 | 0 | 0 | | 1 | 1 | 0 |
| 9 | 0 | 1 | 0 | | 1 | 0 | 1 |
| 10 | 0 | 1 | 0 | | 1 | 0 | 1 |
| 11 | 1 | 0 | 1 | | 1 | 0 | 1 |
| 12 | 1 | 0 | 1 | | 1 | 0 | 1 |
| 13 | 1 | 1 | 0 | | 0 | 1 | 1 |
| 14 | 1 | 1 | 0 | | 0 | 1 | 1 |
| 15 | 1 | 1 | 1 | | 0 | 0 | 0 |
| 16 | 1 | 1 | 1 | | 0 | 0 | 0 |
| 17 | 0 | 1 | 1 | | 1 | 1 | 0 |
| 18 | 0 | 1 | 1 | | 1 | 1 | 0 |
| 19 | 0 | 0 | 1 | | 0 | 1 | 1 |
| 20 | 0 | 0 | 1 | | 0 | 1 | 1 |
| 21 | 1 | 0 | 0 | | 1 | 1 | 0 |
| 22 | 1 | 0 | 0 | | 1 | 1 | 0 |
| 23 | 0 | 1 | 0 | | 1 | 0 | 1 |
| 24 | 0 | 1 | 0 | | 1 | 0 | 1 |
| 25 | 1 | 0 | 1 | | 1 | 0 | 1 |
| 26 | 1 | 0 | 1 | | 1 | 0 | 1 |
| 27 | 1 | 1 | 0 | | 0 | 1 | 1 |
| 28 | 1 | 1 | 0 | | 0 | 1 | 1 |
| 29 | 1 | 1 | 1 | | 0 | 0 | 0 |
| 30 | 1 | 1 | 1 | | 0 | 0 | 0 |
| 31 | 0 | 1 | 1 | | 1 | 1 | 0 |
| 32 | 0 | 1 | 1 | | 1 | 1 | 0 |
| 33 | 0 | 0 | 1 | | 0 | 1 | 1 |
| 34 | 0 | 0 | 1 | | 0 | 1 | 1 |
| 35 | 1 | 0 | 0 | | 1 | 1 | 0 |
| 36 | 1 | 0 | 0 | | 1 | 1 | 0 |
| 37 | 0 | 1 | 0 | | 1 | 0 | 1 |
| 38 | 0 | 1 | 0 | | 1 | 0 | 1 |
| 39 | 1 | 0 | 1 | | 1 | 0 | 1 |
| 40 | 1 | 0 | 1 | | 1 | 0 | 1 |
| 41 | 1 | 1 | 0 | | 0 | 1 | 1 |
| 42 | 1 | 1 | 0 | | 0 | 1 | 1 |

Note: Pattern pair candidates can include those generated from modulo 2 additions generated in Step 2A itself

| | STEP 1 AVAILABLE OUTPUTS FROM HALF RATE PATTERN GENERATOR | | | PRBS3 PATTERN GENERATION | | | | |
|---|---|---|---|---|---|---|---|---|
| | | | | STEP 2A | | | STEP 2B (Option 1a) | STEP 3 |
| TIME [ps] | OUTPUT OF DFF0 | OUTPUT OF DFF1 | OUTPUT OF DFF2 | DFF0 xor DFF1 | DFF0 xor DFF2 | DFF1 xor DFF2 | Output of FULL RATE DFF: DFF0 xor DFF1 delayed by 1 FULL RATE clock cycle "(DFF0_xor_DFF1)_delayed" | Full Rate DFF2 xor (DFF0_xor_DFF1)_delayed |
| 100 | 1 | | | | | | | |
| 200 | 1 | | | | | | | |
| 300 | 0 | 1 | | | | | | |
| 400 | 0 | 1 | | | | | | |
| 500 | 0 | 0 | 1 | 0 | | | 0 | 1 |
| 600 | 0 | 0 | 0 | 0 | 1 | 1 | 0 | 0 |
| 700 | 1 | 0 | 0 | 1 | 1 | 0 | 1 | 1 |
| 800 | 1 | 0 | 0 | 1 | 1 | 0 | 1 | 1 |
| 900 | 0 | 1 | 1 | 1 | 1 | 0 | 1 | 0 |
| 1000 | 0 | 1 | 1 | 1 | 0 | 1 | 1 | 0 |
| 1100 | 1 | 0 | 1 | 0 | 0 | 1 | 1 | 0 |
| 1200 | 1 | 0 | 0 | 0 | 1 | 0 | 0 | 1 |
| 1300 | 1 | 1 | 0 | 0 | 1 | 0 | 0 | 1 |
| 1400 | 1 | 1 | 1 | 1 | 0 | 0 | 0 | 1 |
| 1500 | 1 | 1 | 1 | 0 | 0 | 0 | 1 | 0 |
| 1600 | 1 | 1 | 1 | 1 | 0 | 0 | 0 | 1 |
| 1700 | 0 | 1 | | 0 | | | | |

Delay of 1 FULL RATE clock cycle

MATCH TO *FIG. 9A2*

MATCH TO FIG.9A1

8 bit delay (Option 1a)

Fig. 9A2

| | 1800 | 1900 | 2000 | 2100 | 2200 | 2300 | 2400 | 2500 | 2600 | 2700 | 2800 | 2900 | 3000 | 3100 | 3200 | 3300 | 3400 | 3500 | 3600 | 3700 | 3800 | 3900 | 4000 | 4100 | 4200 |
|---|---|---|---|---|---|---|---|---|---|---|---|---|---|---|---|---|---|---|---|---|---|---|---|---|---|
| | 0 | 0 | 1 | 0 | 1 | 1 | 1 | 0 | 0 | 1 | 0 | 1 | 1 | 0 | 0 | 1 | 0 | 1 | 1 | 1 | 0 | 0 | 1 | 1 | 0 |
| | 1 | 1 | 0 | 0 | 1 | 1 | 1 | 1 | 0 | 0 | 0 | 1 | 1 | 1 | 0 | 0 | 1 | 1 | 1 | 1 | 1 | 1 | 1 | 1 | 0 |
| | 0 | 1 | 1 | 0 | 0 | 1 | 1 | 1 | 0 | 0 | 0 | 1 | 1 | 1 | 0 | 0 | 1 | 1 | 1 | 0 | 1 | 0 | 1 | 1 | 1 |
| | 1 | 1 | 1 | 0 | 0 | 0 | 1 | 0 | 1 | 1 | 0 | 1 | 1 | 0 | 0 | 0 | 1 | 1 | 0 | 1 | 0 | 0 | 1 | 1 | 1 |
| | 1 | 0 | 1 | 1 | 1 | 1 | 0 | 0 | 0 | 1 | 0 | 1 | 1 | 1 | 0 | 1 | 1 | 1 | 0 | 1 | 1 | 1 | 0 | 0 | 0 |
| | 1 | 1 | 1 | 0 | 0 | 0 | 1 | 1 | 0 | 1 | 1 | 1 | 1 | 1 | 1 | 0 | 0 | 0 | 1 | 0 | 0 | 0 | 1 | 0 | 0 |
| | 1 | 0 | 0 | 0 | 0 | 1 | 1 | 0 | 1 | 1 | 1 | 1 | 1 | 0 | 0 | 0 | 1 | 1 | 0 | 0 | 1 | 1 | 0 | 1 | 1 |
| | 0 | 0 | 1 | 1 | 0 | 0 | 1 | 1 | 1 | 1 | 0 | 0 | 0 | 1 | 0 | 0 | 0 | 1 | 1 | 0 | 0 | 1 | 1 | 1 | 1 |

Fig. 10A1

| PRBS3 PATTERN GENERATION ||||||||
|---|---|---|---|---|---|---|---|
| STEP 1 ||| | STEP 2A ||| STEP 2B (Option 1b) | STEP 3 |
| AVAILABLE OUTPUTS FROM HALF RATE PATTERN GENERATOR |||| | | Output of FULL RATE DFF: DFF0 xor DFF2 delayed by 1 FULL RATE clock cycle "(DFF0_xor_DFF2)_delayed" | Full Rate DFF0 xor (DFF0_xor_DFF2)_delayed |
| TIME [ps] | OUTPUT OF DFF0 | OUTPUT OF DFF1 | OUTPUT OF DFF2 | DFF0 XOR DFF1 | DFF0 XOR DFF2 | DFF1 XOR DFF2 | | |
| 100 | 1 | | | 0 | | | | |
| 200 | 1 | | | 0 | | | | |
| 300 | 0 | 1 | | 1 | 1 | 1 | | |
| 400 | 0 | 1 | | 1 | 1 | 0 | 1 | 1 |
| 500 | 0 | 0 | 1 | 1 | 1 | 0 | 1 | 0 |
| 600 | 0 | 0 | 1 | 1 | 0 | 1 | 0 | 1 |
| 700 | 1 | 0 | 0 | 1 | 0 | 1 | 0 | 0 |
| 800 | 1 | 0 | 0 | 1 | 0 | 1 | 0 | 1 |
| 900 | 0 | 1 | 0 | 1 | 0 | 1 | 0 | 0 |
| 1000 | 0 | 1 | 0 | 1 | 1 | 1 | 1 | 1 |
| 1100 | 1 | 0 | 1 | 1 | 0 | 1 | 0 | 1 |
| 1200 | 1 | 0 | 1 | 1 | 0 | 1 | 0 | 1 |
| 1300 | 1 | 1 | 0 | 0 | 1 | 1 | 1 | 1 |
| 1400 | 1 | 1 | 0 | 0 | 1 | 1 | 1 | 0 |
| 1500 | 1 | 1 | 1 | 0 | 0 | 0 | 0 | 0 |
| 1600 | 1 | 1 | 1 | 0 | 0 | 0 | 0 | 0 |
| 1700 | 0 | 1 | 1 | 1 | 1 | 0 | | |

Delay of 1 FULL RATE clock cycle

MATCH TO FIG. 10A2

MATCH TO *FIG. 11A2*

PRBS3 PATTERN GENERATION

| TIME [ps] | STEP 1: AVAILABLE OUTPUTS FROM HALF RATE PATTERN GENERATOR | | | STEP 2A | | | STEP 2B (Option 1a) | STEP 3 |
|---|---|---|---|---|---|---|---|---|
| | OUTPUT OF DFF0 | OUTPUT OF DFF1 | OUTPUT OF DFF2 | DFF0 xor DFF1 | DFF0 xor DFF2 | DFF1 xor DFF2 | Output of FULL RATE DFF: DFF1 delayed by 1 FULL RATE clock cycle "(DFF1_delayed)" | Full Rate DFF1_delayed xor (DFF0_xor_DFF1) |
| 100 | 1 | | | | | | | |
| 200 | 1 | | | | | | | |
| 300 | 0 | 1 | | | | | | |
| 400 | 0 | 1 | | | | | | |
| 500 | 0 | 0 | 1 | 0 | | | | |
| 600 | 0 | 0 | 0 | 1 | 1 | 1 | 0 | 0 |
| 700 | 1 | 0 | 0 | 1 | 1 | 0 | 0 | 1 |
| 800 | 1 | 1 | 0 | 0 | 1 | 1 | 0 | 1 |
| 900 | 0 | 1 | 1 | 1 | 0 | 1 | 0 | 0 |
| 1000 | 0 | 0 | 1 | 0 | 1 | 1 | 1 | 0 |
| 1100 | 1 | 0 | 0 | 1 | 1 | 0 | 0 | 1 |
| 1200 | 1 | 1 | 0 | 0 | 1 | 1 | 0 | 1 |
| 1300 | 0 | 1 | 1 | 0 | 0 | 0 | 1 | 0 |
| 1400 | 0 | 0 | 1 | 0 | 0 | 0 | 1 | 1 |
| 1500 | 1 | 1 | | | | | 1 | 0 |
| 1600 | 1 | 1 | | | | | | 1 |
| 1700 | 0 | 1 | | | | | | 0 |

Delay of 1 FULL RATE clock cycle

PRBS4 PATTERN GENERATION

| TIME [ps] | STEP 1 AVAILABLE OUTPUTS FROM HALF RATE PATTERN GENERATOR | | | | STEP 2A ALL POSSIBLE XOR PERMUTATIONS | | | | | | STEP 2B Output of FULL RATE DFF: DFF0 xor DFF2 delayed by 1 FULL RATE clock cycle "(DFF0_xor_DFF2)_delayed" | STEP 3 Full Rate PRBS4 Pattern DFF2 xor (DFF0_xor_DFF2)_delayed |
|---|---|---|---|---|---|---|---|---|---|---|---|---|
| | OUTPUT OF DFF0 | OUTPUT OF DFF1 | OUTPUT OF DFF2 | OUTPUT OF DFF3 | DFF0 XOR DFF1 | DFF0 XOR DFF2 | DFF0 XOR DFF3 | DFF1 XOR DFF2 | DFF1 XOR DFF3 | DFF2 XOR DFF3 | | |
| 100 | 0 | | | | | | | | | | | |
| 200 | 0 | | | | | | | | | | | |
| 300 | 1 | 0 | | | | | | | | | | |
| 400 | 1 | 0 | | | | | | | | | | |
| 500 | 1 | 1 | 0 | | | | | | | | | |
| 600 | 1 | 1 | 0 | | | | | | | | | |
| 700 | 1 | 1 | 1 | 0 | 0 | 0 | 1 | 0 | 1 | 1 | 0 | 1 |
| 800 | 1 | 1 | 1 | 0 | 0 | 0 | 1 | 0 | 1 | 1 | 0 | 1 |
| 900 | 0 | 1 | 1 | 1 | 1 | 1 | 0 | 0 | 1 | 0 | 0 | 1 |
| 1000 | 0 | 0 | 1 | 1 | 0 | 1 | 1 | 1 | 1 | 0 | 1 | 0 |
| 1100 | 0 | 0 | 0 | 1 | 0 | 0 | 1 | 0 | 1 | 1 | 1 | 0 |
| 1200 | 1 | 0 | 0 | 1 | 1 | 1 | 0 | 0 | 1 | 1 | 0 | 1 |
| 1300 | 0 | 1 | 0 | 0 | 1 | 0 | 0 | 1 | 1 | 0 | 0 | 0 |
| 1400 | 0 | 0 | 1 | 0 | 0 | 1 | 0 | 1 | 0 | 1 | 0 | 0 |
| 1500 | 0 | 0 | 0 | 1 | 0 | 0 | 1 | 0 | 1 | 1 | | |
| 1600 | 0 | 0 | 0 | 0 | 0 | 0 | 0 | 0 | 0 | 0 | | |
| 1700 | 1 | 0 | 0 | 0 | 1 | 1 | 1 | 0 | 0 | 0 | | |

MATCH TO FIG. 12A2

Fig. 12A2

| TIME [full rate UI] | PRBS3 $y[n] = y[n-3] + y[n-2]$ | |
| --- | --- | --- |
| | FULL RATE | QUARTER RATE |
| 1 | 1 | 1 |
| 2 | 1 | 1 |
| 3 | 1 | 1 |
| 4 | 0 | 1 |
| 5 | 0 | 1 |
| 6 | 1 | 1 |
| 7 | 0 | 1 |
| 8 | | 1 |
| 9 | | 1 |
| 10 | | 1 |
| 11 | | 1 |
| 12 | | 1 |
| 13 | | 0 |
| 14 | | 0 |
| 15 | | 0 |
| 16 | | 0 |
| 17 | | 0 |
| 18 | | 0 |
| 19 | | 0 |
| 20 | | 0 |
| 21 | | 1 |
| 22 | | 1 |
| 23 | | 1 |
| 24 | | 1 |
| 25 | | 0 |
| 26 | | 0 |
| 27 | | 0 |
| 28 | | 0 |

*Fig. 13A*

| TIME [full rate UI] | STEP 1 AVAILABLE OUTPUTS FROM QUARTER RATE PRBS3 PATTERN GENERATOR | | |
|---|---|---|---|
| | OUTPUT OF DFF0 | OUTPUT OF DFF1 | OUTPUT OF DFF2 |
| 1 | 1 | | |
| 2 | 1 | | |
| 3 | 1 | | |
| 4 | 1 | | |
| 5 | 1 | 1 | |
| 6 | 1 | 1 | |
| 7 | 1 | 1 | |
| 8 | 1 | 1 | |
| 9 | 1 | 1 | 1 |
| 10 | 1 | 1 | 1 |
| 11 | 1 | 1 | 1 |
| 12 | 1 | 1 | 1 |
| 13 | 0 | 1 | 1 |
| 14 | 0 | 1 | 1 |
| 15 | 0 | 1 | 1 |
| 16 | 0 | 1 | 1 |
| 17 | 0 | 0 | 1 |
| 18 | 0 | 0 | 1 |
| 19 | 0 | 0 | 1 |
| 20 | 0 | 0 | 1 |
| 21 | 1 | 0 | 0 |
| 22 | 1 | 0 | 0 |
| 23 | 1 | 0 | 0 |
| 24 | 1 | 0 | 0 |
| 25 | 0 | 1 | 0 |
| 26 | 0 | 1 | 0 |
| 27 | 0 | 1 | 0 |
| 28 | 0 | 1 | 0 |
| 29 | 1 | 0 | 1 |
| 30 | 1 | 0 | 1 |
| 31 | 1 | 0 | 1 |
| 32 | 1 | 0 | 1 |
| 33 | 1 | 1 | 0 |
| 34 | 1 | 1 | 0 |
| 35 | 1 | 1 | 0 |
| 36 | 1 | 1 | 0 |
| 37 | 1 | 1 | 1 |
| 38 | 1 | 1 | 1 |
| 39 | 1 | 1 | 1 |
| 40 | 1 | 1 | 1 |
| 41 | 0 | 1 | 1 |
| 42 | 0 | 1 | 1 |
| 43 | 0 | 1 | 1 |
| 44 | 0 | 1 | 1 |
| 45 | 0 | 0 | 1 |

MATCH TO FIG.16B

Fig. 16B

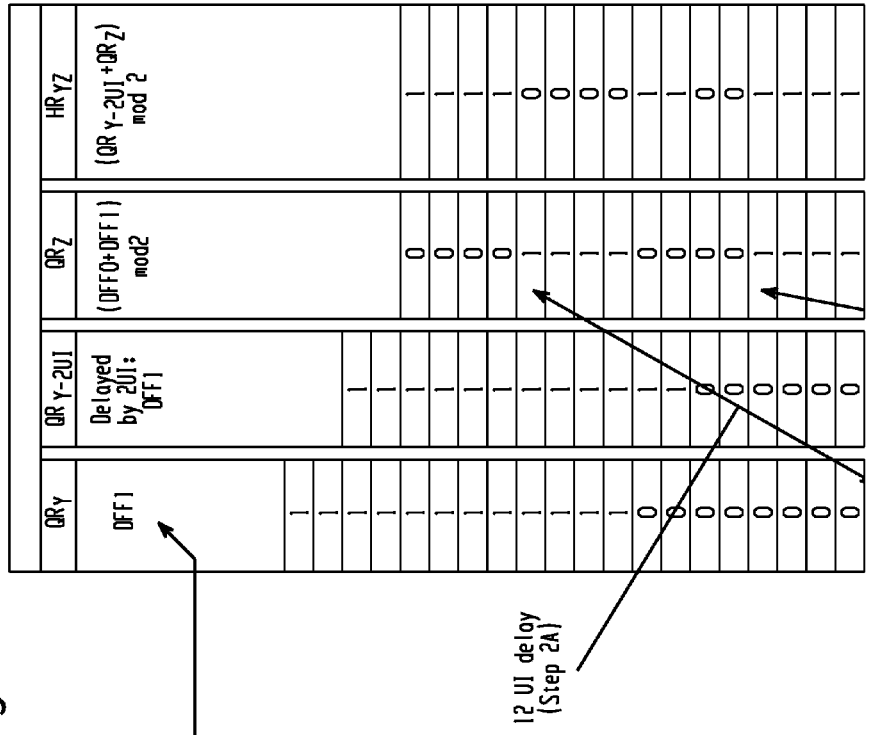

PRBS3 LFSR Driven by QUARTER rate clock producing a QUARTER rate PRBS3 Pattern

SYSTEMS AND METHODS FOR RANDOM NUMBER GENERATION USING A FRACTIONAL RATE CLOCK

CROSS-REFERENCE TO RELATED APPLICATIONS

This application claims priority to U.S. Provisional Patent Application No. 61/920,847, entitled "Fractional Rate PRBS Pattern Generation Algorithm," filed Dec. 26, 2013, the entirety of which is herein incorporated by reference.

FIELD

This disclosure is related generally to pseudo-random number generation and more particularly to pseudo-random number generation using a fractional rate clock.

BACKGROUND

Pseudo-random binary sequence (PRBS) signal generators find a variety of uses including testing of memories and other microprocessor devices. PRBS generators can be included on-chip to enable device and system level testing of components. Performing at-speed testing using a built in self-test (BIST) block, such as a PRBS generator, can reduce high speed test costs while maintaining high speed test coverage. Generating an at-speed or full-rate PRBS signal generally comes at an expense of power and area, with that expense becoming more apparent at increased device data rates and/or higher order PRBS sequences.

SUMMARY

Systems and methods are provided for generating a pseudo-random bit sequence at an output frequency using a clock signal operating at a first frequency that is lower than the output frequency. A first bit sequence of a particular type is generated using a clock signal operating at a first frequency. A second bit sequence is generated using the clock signal operating at the first frequency, where the second bit sequence is a delayed version of the first bit sequence. A delayed version of the first bit sequence is generated using the second bit sequence and another bit sequence, wherein the delayed version is delayed based on the particular type and a difference between the output frequency and the first frequency. The first bit sequence and the delayed version are combined to generate a pseudo-random bit sequence at the output frequency.

As another example, a system for generating a pseudo-random bit sequence at an output frequency using a clock signal operating at a first frequency that is lower than the output frequency includes a pseudo-random number generator operating at a first frequency, the pseudo-random number generator including a plurality of stages, a first bit sequence being output by a first stage, and a second bit sequence being output by a second stage, wherein the second bit sequence is a delayed version of the first bit sequence. An exclusive-or circuit is configured to generate a delayed version of the first bit sequence using the second bit sequence and another bit sequence. A combining circuit is configured to combine the first bit sequence and the delayed version to generate a pseudo-random bit sequence at the output frequency.

BRIEF DESCRIPTION OF THE DRAWINGS

FIG. 1 is a diagram depicting a pseudo-random bit sequence generator that provides a pseudo-random bit sequence at an output frequency using a clock signal operating at a first frequency that is lower than the output frequency.

FIG. 2 is a flow diagram depicting an example process for generating a full-rate PRBS pattern using a less than full-rate clock.

FIG. 3 is a flow diagram depicting an example process for generating the two identical patterns delayed by a specified amount.

FIG. 6 is a diagram depicting the pattern at a full-rate (e.g., 10 Gb/s) in a left column and a half-rate (e.g., 5 Gb/s) in a right column.

FIG. 7 identifies certain intermediate values in generating a full-rate PRBS pattern using a half-rate clock.

FIG. 8 identifies a plurality of candidate pairs among the depicted columns.

FIGS. 9A1 and 9A2 depicts an example where a DFF2 and (DFF0 XOR DFF1) candidate pair is selected.

FIGS. 10A1 and 10A2 depicts a second example where a DFF0 and (DFF0 XOR DFF2) candidate pair is selected.

FIGS. 11A1 and 11A2 depicts a third example where a DFF1 and (DFF0 XOR DFF1) candidate pair is selected.

FIGS. 12A1 and 12A2 identifies example patterns from which to select a candidate pair for generating a full-rate PRBS4 signal.

FIG. 13A indicates the difference between a full-rate signal in the left column and a quarter-rate signal in the right column, with the quarter-rate signal asserting each symbol of the pattern for four times as long.

FIG. 14 indicates the outputs of the three stages of the LFSR.

FIGS. 16A and 16B are a diagram depicting identification of a first quarter-rate signal candidate pair and generation of a corresponding half-rate signal.

FIGS. 17A and 17B are a diagram depicting identification of a second quarter-rate signal candidate pair and generation of a corresponding half-rate signal.

FIGS. 18A and 18B are a diagram depicting the desired relative delay between $HR_{AB}$ and $HR_{YZ}$ and the full-rate unit delay of the $HR_{YZ}$ signal.

FIGS. 19A and 19B depicts the XOR or modulo 2 combining of the $HR_{AB}$ and delayed $HR_{YZ}$ signals to generate the full-rate PRBS signal.

DETAILED DESCRIPTION

Figures 4A, 4B:
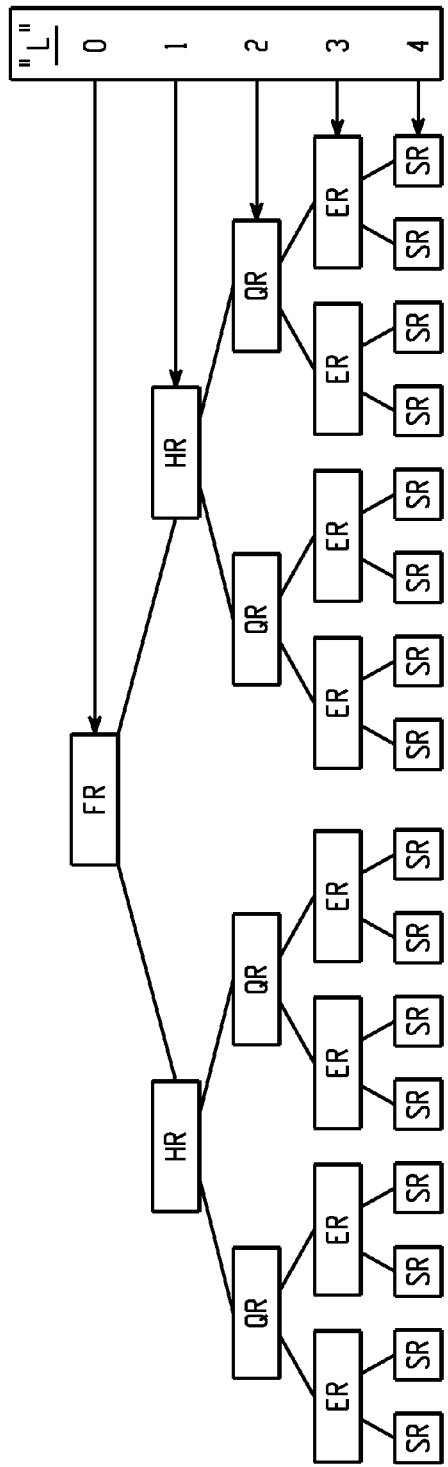
FIG. 4A is a diagram depicting example levels of L utilized when generating clocks using less than full-rate clocks to generate PRBS patterns.
FIG. 4B graphically indicates how individual PRBS patterns operating at slower clock rates can be combined to generate a full-rate PRBS pattern.

FIG. 1 is a diagram depicting a pseudo-random bit sequence generator that provides a pseudo-random bit sequence at an output frequency using a clock signal operating at a first frequency that is lower than the output frequency. The pseudo-random bit sequence generator 102 receives a first frequency clock 104 and an indication of an output frequency 106. The generator 102 outputs a pseudo-random bit sequence 108 at the identified output frequency 106, where the output frequency 106 is greater than the frequency of the first frequency clock 102. In one example, the generator 102 receives additional parameters 110, such as a type of bit sequence to be output at 108.

In one example, PRBS patterns are maximal length sequence patterns that are generated using linear feedback shift registers (LFSRs) tapped at specific feedback nodes. Circuit level components representing the registers are sometimes implemented using delay flip flops (DFFs) that utilize a clock signal. In traditional PRBS generators, the clock rate required to produce a full-rate PRBS pattern is full-rate (e.g., a 10 GHz clock is required to output a 10 Gb/s PRBS pattern).

The pseudo-random bit sequence generator 102 generates a full-rate PRBS pattern using a clock transacting at only a fraction of the full data rate within the linear feedback shift register. Example benefits include potentially significant power savings and potential improvements in signal quality, especially at higher data rates and/or higher order PRBS sequences.

FIG. 2 is a flow diagram depicting an example process for generating a full-rate PRBS pattern using a less than full-rate clock. At 202, a linear feedback shift register is implemented with a feedback network tapped such that it produces a fractional rate PRBS "K" pattern driven by a fractional rate clock. The fractional rate is the number of times the data rate is divided (e.g., by 2) relative to the intended full-rate. That is, if the full-rate is 10 Gb/s, then fractional rates can be 5 Gb/s, 2.5 Gb/s, 1.25 Gb/s. "K" identifies the order of the pattern. For a PRBS3 pattern, K=3, and for a PRBS31 pattern, K=31. In one example, K is equal to the number of delay stages of an associated LFSR. L is defined as a number of times a PRBS "K" full-rate pattern must be divided by a factor of two to achieve the same rate as a corresponding PRBS "K" fractional rate pattern, Full-rate Divisor=$2^L$.

At 204, available tap points are used to generate identical PRBS "K" patterns that are delayed by a predetermined amount. In one example, the two patterns are delayed by exactly $2^{K+L-1}-2^{L-1}$ full-rate bits (or equivalently, full-rate UI). Available tap points in one example come directly from the LFSR flops or those that are recursively generated as discussed in further detail below.

At 206, a modulo 2 addition is performed between each bit of the fractional rate patterns created at 204 to attain a PRBS "K" pattern whose rate is a multiple of 2 higher. L is decremented by 1:L=L−1, and if the patterns created are not yet full-rate (i.e., L>0), then recursively return to 204 using the patterns created at 206 as an available set of candidate tap points.

FIG. 3 is a flow diagram depicting an example process for generating the two identical patterns delayed by a specified amount. In one embodiment, to generate the two bit patterns at 204, one or more sets of candidate pattern pairs are identified at 302. In one example, the candidate pairs are identified by performing all possible modulo 2 combinations of available tap points to identify the sets of pattern pairs which, relative to each other, have a delay of $2^{K+L-1}$ or $2^{K+L-1}-2^L$.

At 304, following selection of a candidate pair, one of the two patterns of the pair are delayed by "L" full-rate UI (clock cycles) so that the resultant relative delay of each pattern within the pair is $2^{K+L-1}-2^{L-1}$ full-rate UI.

FIG. 4A is a diagram depicting example levels of L utilized when generating clocks using less than full-rate clocks to generate PRBS patterns. The full-rate in the example of FIG. 4A is 10 Gb/s. A half-rate clock (5 GHz) can be utilized to generate the 10 Gb/s PRBS pattern, where a value of L=1 is utilized. A quarter-rate clock (2.5 GHz) can be utilized to generate the 10 Gb/s PRBS pattern, where a value of L=2 is utilized. An eighth-rate clock (1.25 GHz) can be utilized to generate the 10 Gb/s PRBS pattern, where a value of L=3 is utilized. FIG. 4B graphically indicates how individual PRBS patterns operating at slower clock rates can be combined to generate a full-rate PRBS pattern. For example, for a half-rate clock (5 GHz), two half-rate PRBS patterns are combined to generate the full-rate (10 Gb/s) pattern. For an eighth-rate clock (1.25 GHz), eight eighth-rate PRBS patterns are combined to generate the full-rate (10 Gb/s) pattern.

FIGS. 5-11 illustrate a first example of providing a full-rate PRBS pattern using a half-rate clock. This example generates a 10 Gb/s PRBS3 pattern using a fractional rate clock to produce a 5 Gb/s PRBS3 pattern. FIG. 5A identifies a value of L=1 for use of a half-rate clock. The L value can also be determined according to: $2^L$=Full-rate Division=10 GHz/5 GHz=2, resulting in L=1. As illustrated in FIG. 5A, to generate a full-rate PRBS pattern, two half-rate patterns are generated. In the example of FIGS. 5-11, a PRBS3 pattern is generated using the following feedback polynomial: $X^3+X^2+X^1$; and has an equation representation of:

$$y[n]=y[n-3] \text{ XOR } y[n-2]$$

Figure 5A:
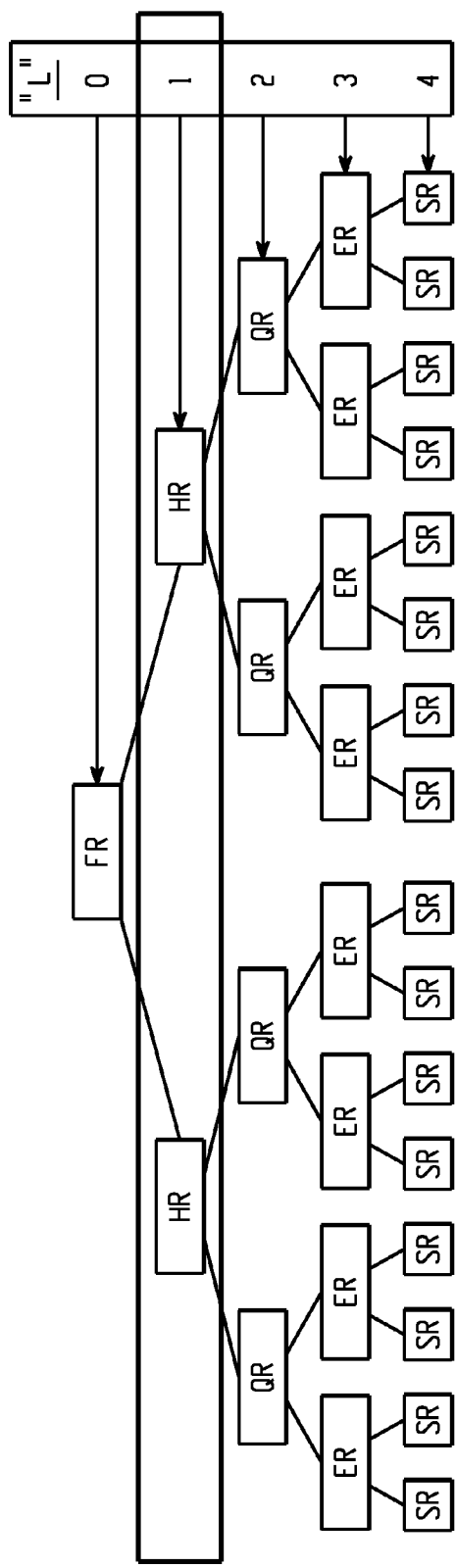
FIG. 5A identifies a value of L=1 for use of a half-rate clock.
Figure 5B:
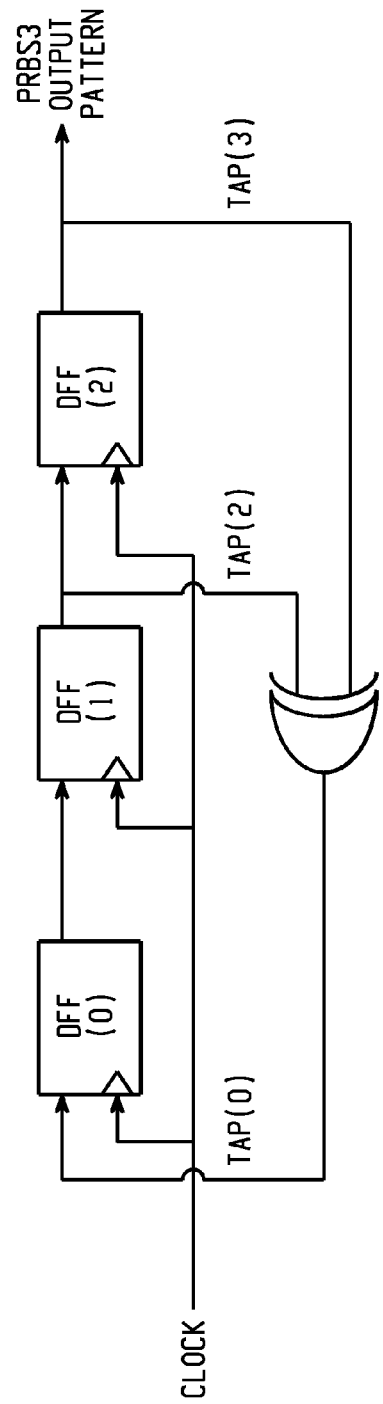
FIG. 5B is an illustration of a PRBS3 pattern generation circuit for implementing the equation representation.

FIG. 5B is an illustration of a PRBS3 pattern generation circuit for implementing the equation representation. This circuit generates a repeating pattern of "1110010." FIG. 6 is a diagram depicting this pattern at a full-rate (e.g., 10 Gb/s) in a left column and a half-rate (e.g., 5 Gb/s) in a right column. Notice that each symbol of the pattern "1110010," is present for twice the period in the half-rate column. The process described above with respect to FIG. 3 is executed to convert the repeating sequence of the half-rate column to generate the sequence of the full-rate column.

With reference to FIG. 3, at 202, the LFSR from FIG. 4 is driven by a 5 GHz clock to generate a 5 Gb/s PRBS3 pattern. At 204, the available tap points of the LFSR are utilized to generate pairs of PRBS3 patterns that are identical but delayed relative to each other by $2^{K+L-1}-2^{L-1}$ full-rate bits by the procedures at 302, 304. FIG. 7 identifies certain intermediate values in generating a full-rate PRBS pattern using a half-rate clock. The outputs of the three LFSR tap points are identified in the left columns, where each tap point outputs the "1110010" pattern (for 2 full-rate clock cycles per symbol), delayed by one half-rate cycle (2 full-rate cycles) from a preceding tap point.

At 302, one or more candidate pairs are identified from the tap point patterns identified at the left of FIG. 7. Step 302 seeks to identify one or more pairs of signals that have a relative delay of $2^{K+L-1}$ or $2^{K+L-1}-2^L$. In the current example where K=3 and L=1, this step seeks relative delays of 8 or 6 full-rate cycles. In the current example, such delayed candidate pairs are identified from the LFSR tap points (i.e., the left 3 columns). Additional patterns for candidate pairs can be generated by performing modulo 2 combinations of existing columns (e.g., DFF0+DFF1; DFF0+DFF2; DFF1+DFF2 (as depicted in the right 3 columns)). Further patterns can be generated through additional combinations, such as (DFF0+DFF1+DFF2). FIG. 8 identifies a plurality of candidate pairs among the depicted columns that include: DFF1 and (DFF0+DFF1) mod 2; DFF2 and (DFF1+DFF2) mod 2; DFF0 and (DFF0+DFF2) mod 2; DFF2 and (DFF0+DFF1) mod 2; DFF2 and (DFF1+DFF2) mod 2; and (DFF0+DFF2) mod 2 and (DFF1+DFF2) mod 2. An XOR operation would be equivalent to the above identified modulo 2 operation. Any of these candidate pairs may be selected, in one embodiment, such as randomly or on a first-identified basis.

Figure 9B:
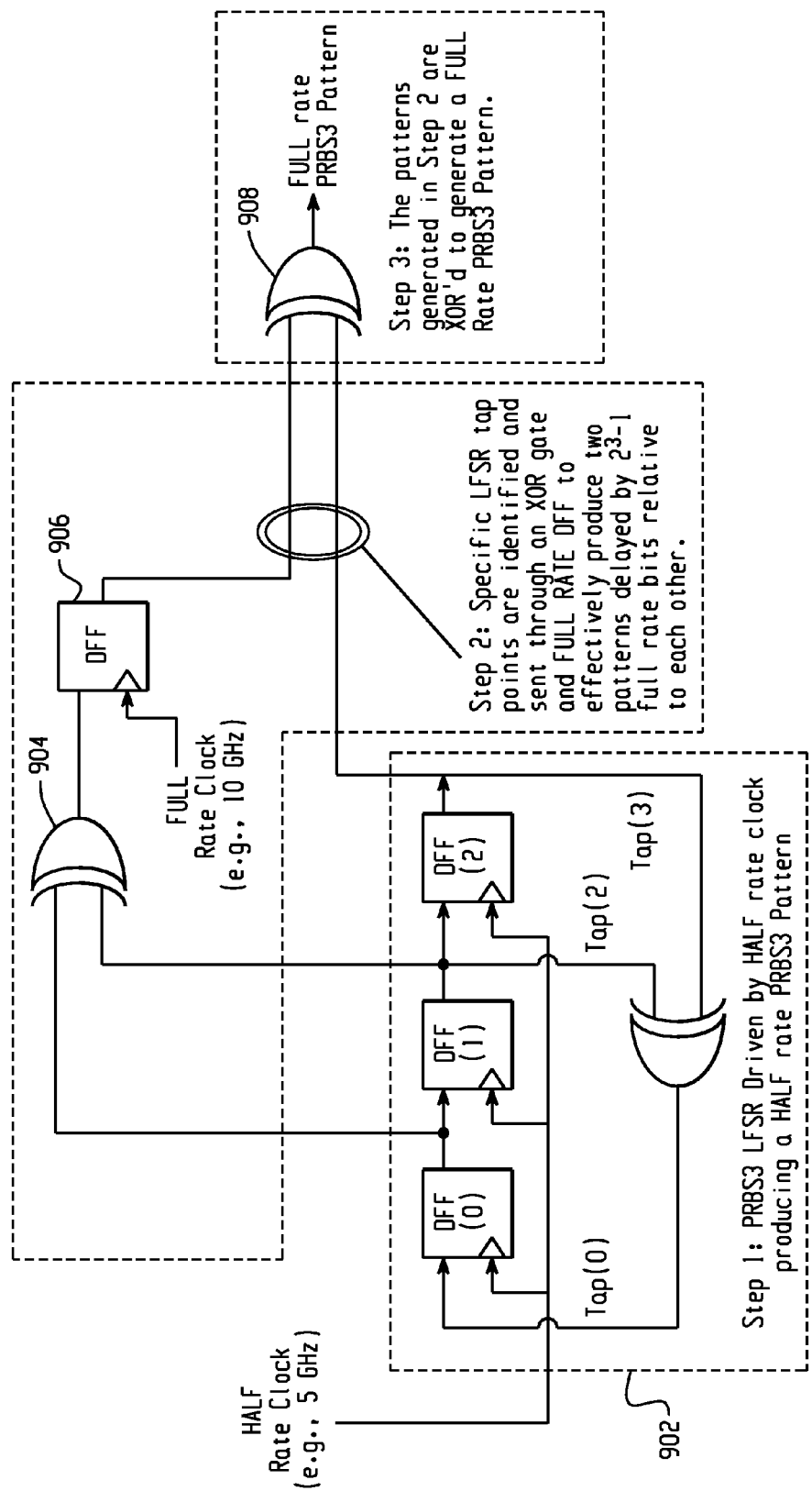
FIG. 9B depicts a circuit implementation for generating the full-rate PRBS signal using the half-rate LFSR.

At 304, one of the two patterns of the identified candidate pair is delayed by L=1 full-rate cycles to achieve two half-rate PRBS patterns having a relative delay of $2^{K+L-1}-2^{L-1}$ full-rate units ($2^{3+1-1}-2^{1-1}=7$ UIs). FIG. 9A depicts an example where a DFF2 and (DFF0 XOR DFF1) candidate pair is selected. The (DFF0 XOR DFF1) pattern is delayed by L=1 full-rate cycle (100 ps) to generate (DFF0 XOR DFF1)_delayed as indicated in the Step 2B column. This pattern is combined via a modulo 2 or XOR operation in the step 3 column with the pattern from the DFF2 column at each full-rate cycle to generate the full-rate PRBS signal identified in the Step 3 column. FIG. 9B depicts a circuit implementation for generating this full-rate PRBS signal using the half-rate LFSR at 902. (DFF0 XOR DFF1) is generated at 904, that signal is delayed by one full-rate cycle at 906, and that delayed signal is combined with DFF2 via an XOR or modulo 2 operation at 908 to generate the full-rate PRBS3 signal. The delayed signal generated at 906 is generated by a full-rate clock in one example. In other examples, the delayed signal is generated using: buffers and/or passive components to create the required delay; a 180 degree phase shifted inverted version of the half-rate clock of the previous (L−1) level; an intermediary divided down clock.

Figure 10A2:
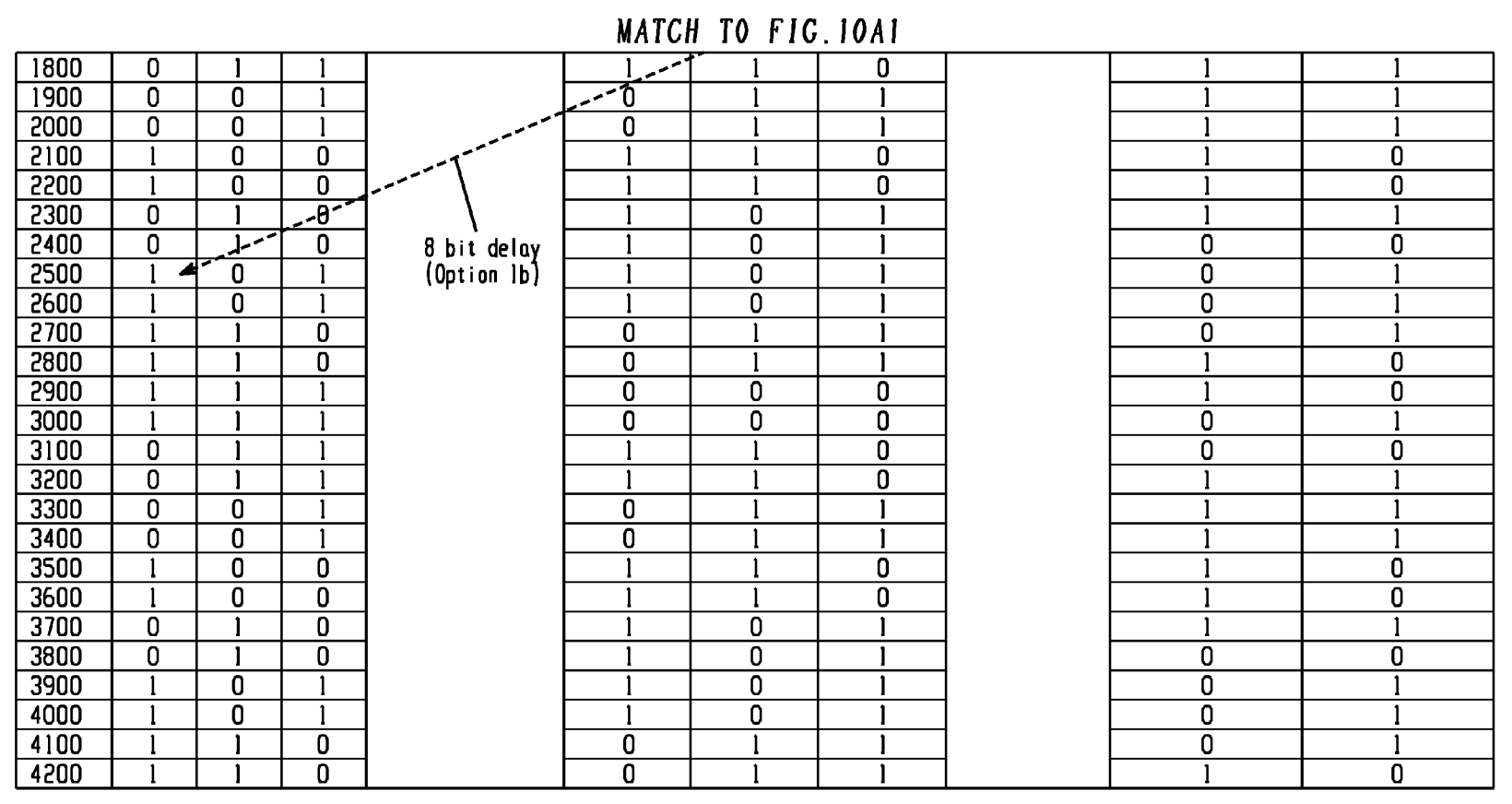
Figure 10B:
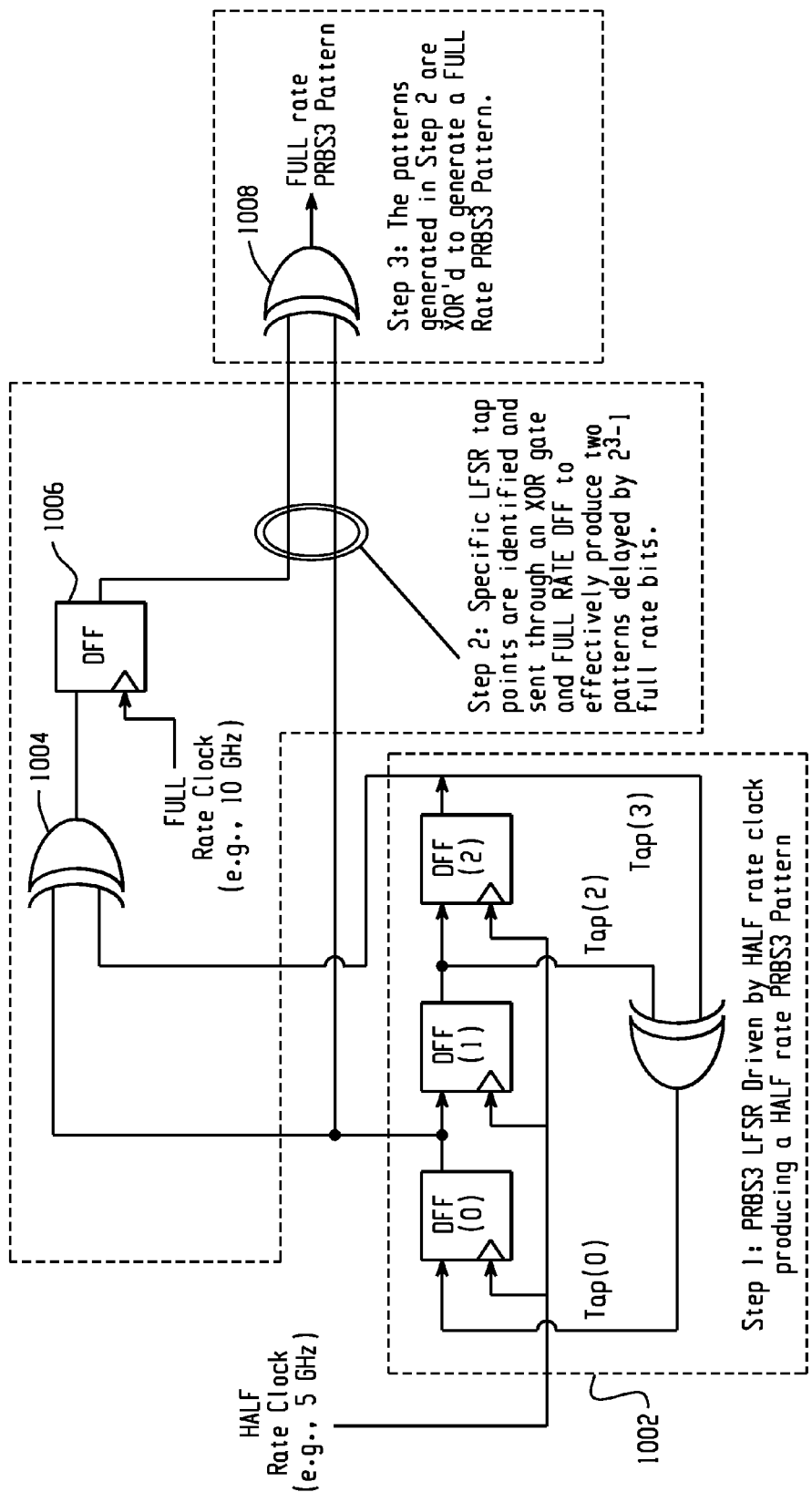
FIG. 10B depicts a circuit implementation for generating the full-rate PRBS signal using the half-rate LFSR.

FIG. 10A depicts a second example where a DFF0 and (DFF0 XOR DFF2) candidate pair is selected. The (DFF0 XOR DFF2) pattern is delayed by L=1 full-rate cycle (100 ps) to generate (DFF0 XOR DFF2)_delayed as indicated in the Step 2B column. This pattern is combined via a modulo 2 or XOR operation in the step 3 column with the pattern from the DFF0 column at each full-rate cycle to generate the full-rate PRBS signal identified in the Step 3 column. FIG. 10B depicts a circuit implementation for generating this full-rate PRBS signal using the half-rate LFSR at 1002. (DFF0 XOR DFF2) is generated at 1004, that signal is delayed by one full-rate cycle at 1006, and that delayed signal is combined with DFF0 via an XOR or modulo 2 operation at 1008 to generate the full-rate PRBS3 signal.

Figure 11A2:
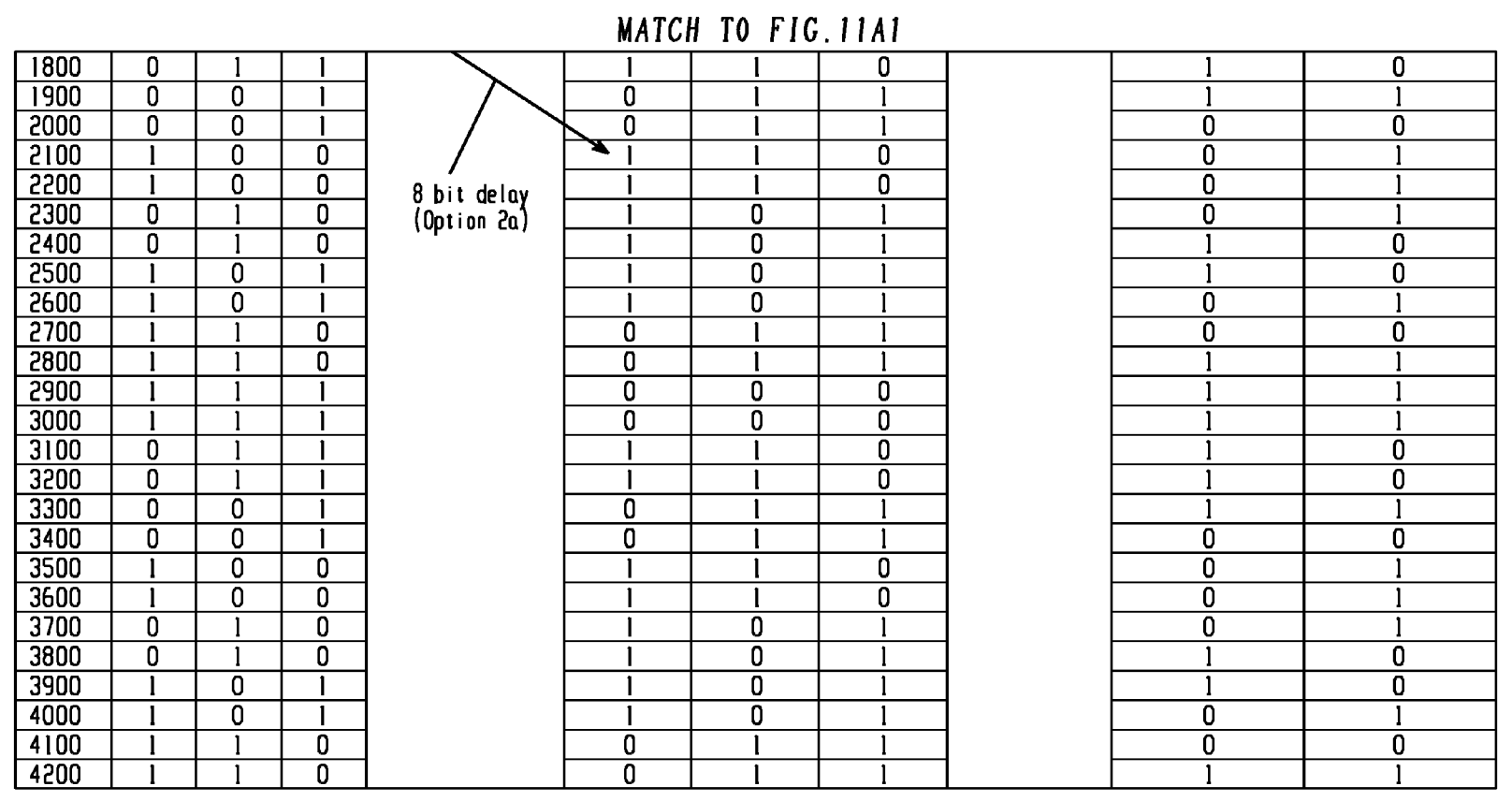
Figure 11B:
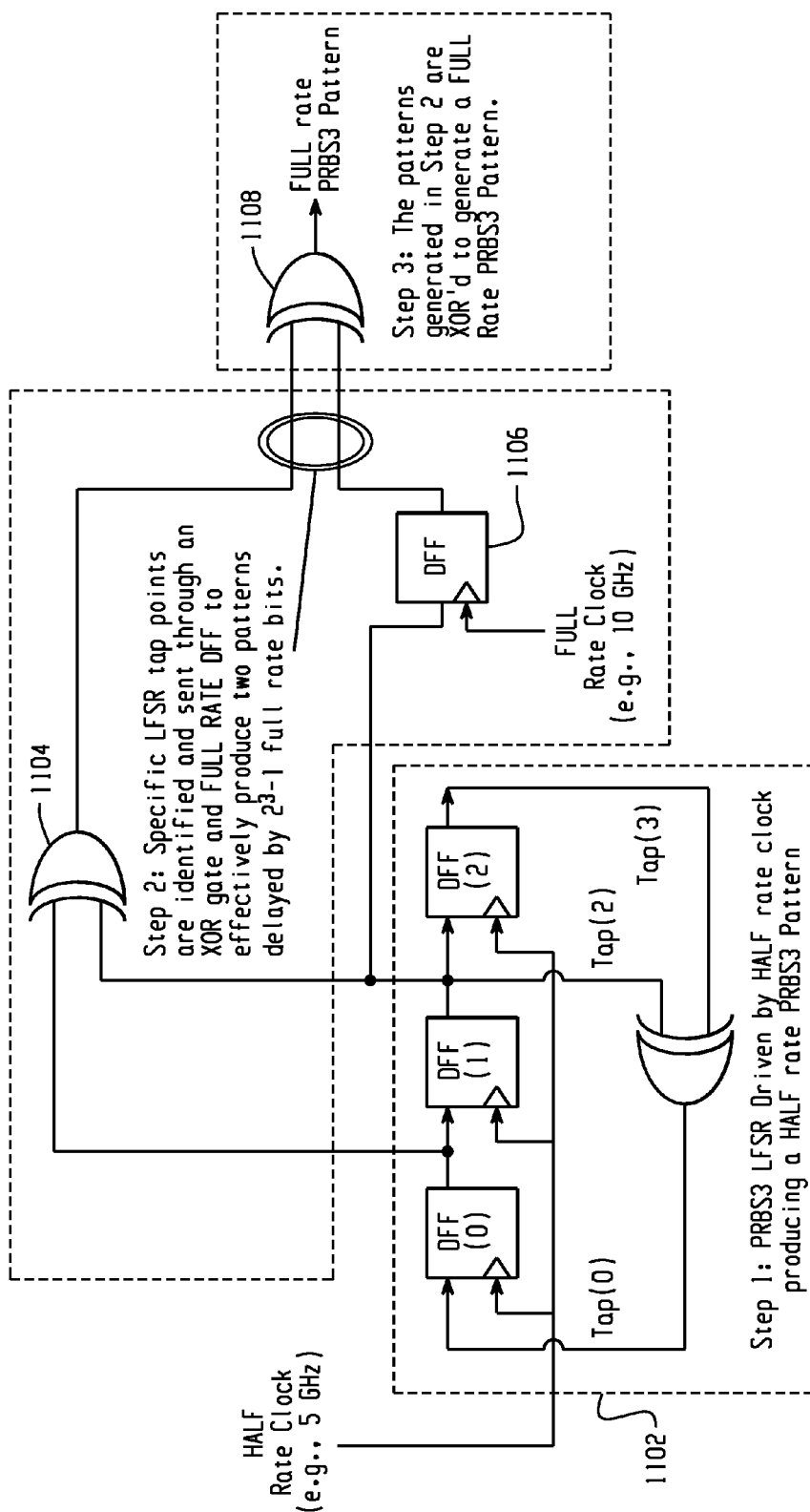
FIG. 11B depicts a circuit implementation for generating the full-rate PRBS signal using the half-rate LFSR.

FIG. 11A depicts a third example where a DFF1 and (DFF0 XOR DFF1) candidate pair is selected. The DFF1 pattern is delayed by L=1 full-rate cycle (100 ps) to generate DFF1_delayed as indicated in the Step 2B column. This pattern is combined via a modulo 2 or XOR operation in the step 3 column with the pattern from the (DFF0 XOR DFF1) column at each full-rate cycle to generate the full-rate PRBS signal identified in the Step 3 column. Notice that despite the 8 bit required relative delay, the full-rate PRBS signal in the right column is actively producing data after only five bit cycles (i.e., less than the relative delay). FIG. 11B depicts a circuit implementation for generating this full-rate PRBS signal using the half-rate LFSR at 1102. (DFF0 XOR DFF1) is generated at 1104. DFF1 is delayed by one full-rate cycle at 1106, and that delayed signal is combined with (DFF0 XOR DFF1) via an XOR or modulo 2 operation at 1108 to generate the full-rate PRBS3 signal.

Figure 12A2:
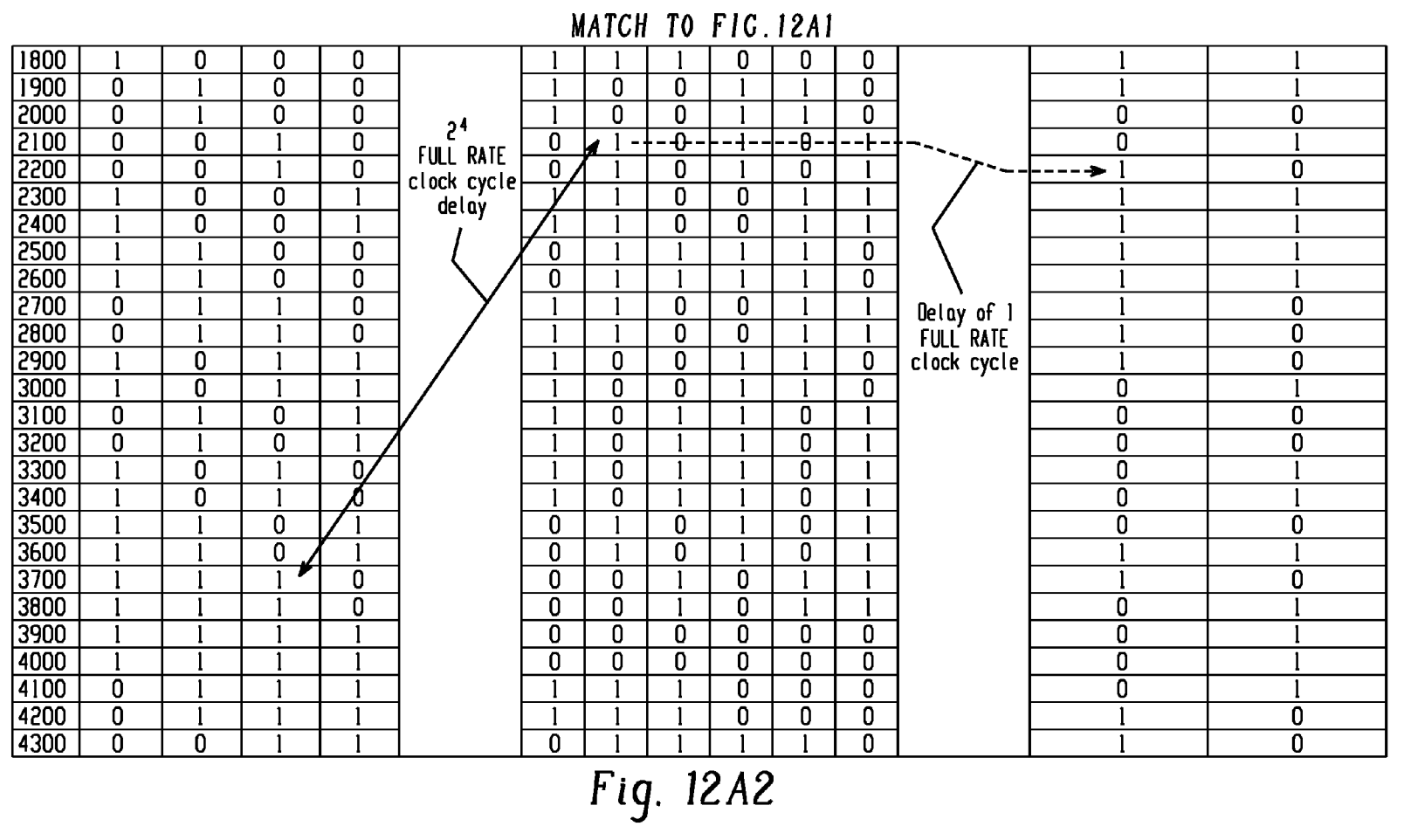
Figure 12B:
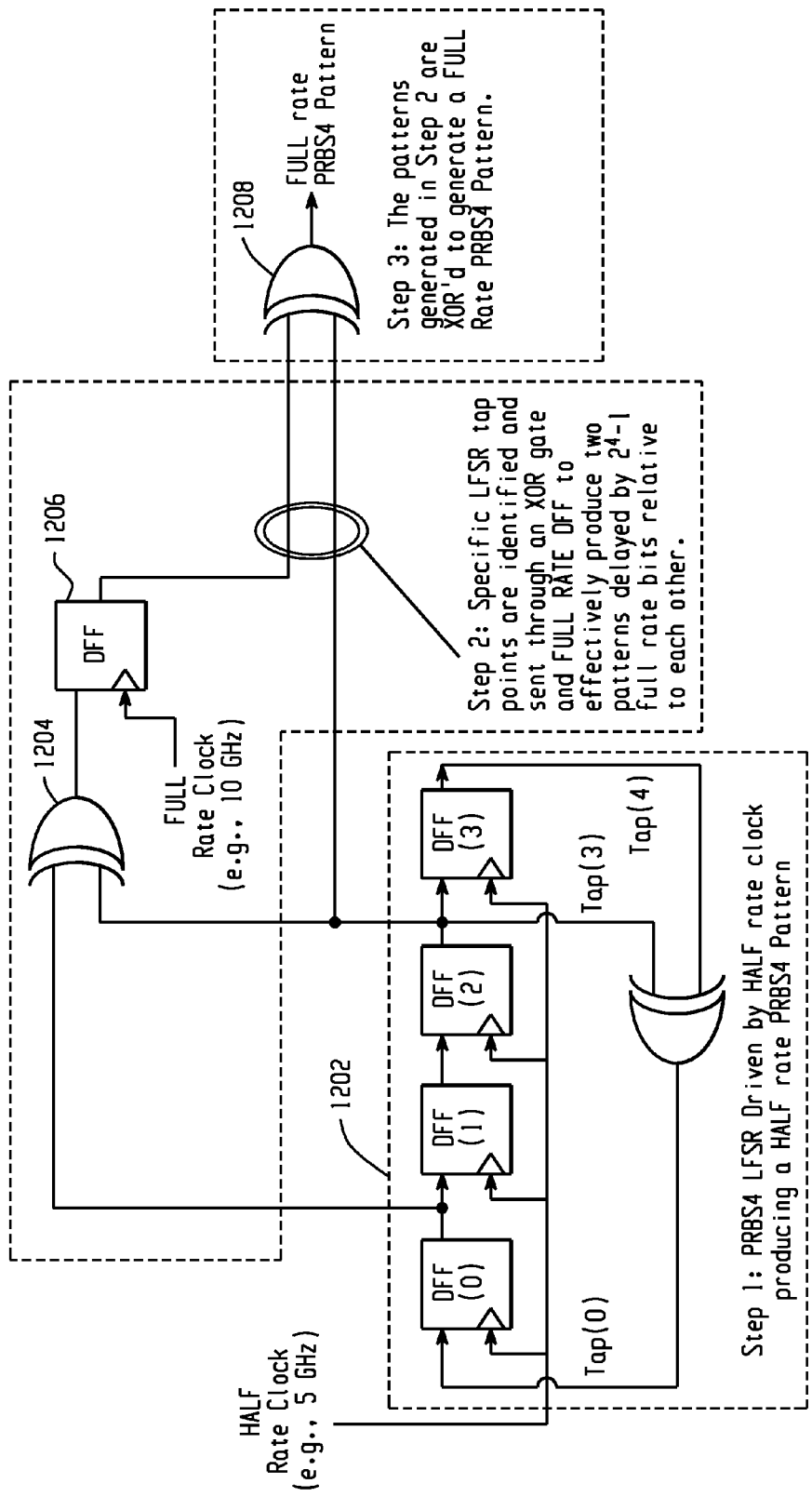
FIG. 12B depicts a circuit implementation for generating a full-rate PRBS signal using a half-rate PRBS4 LFSR.
Figure 13B:
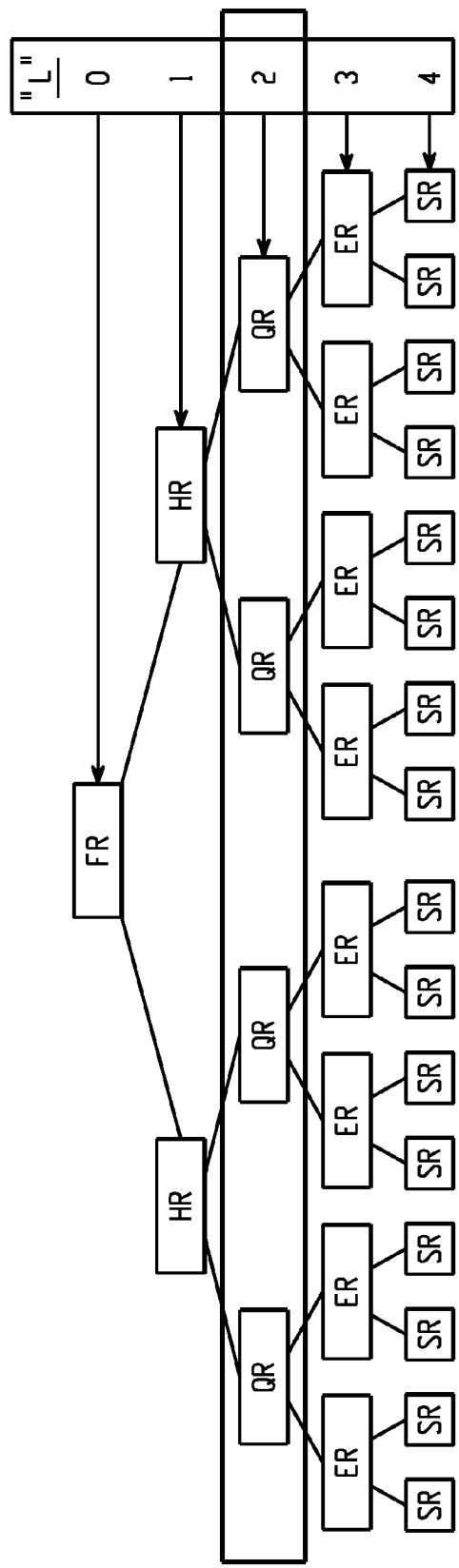
FIG. 13B indicates that four component quarter-rate signals are used to generate the full-rate signal, and L=2.

FIGS. 12A and 12B depict an example using a four stage PRBS4 LFSR. FIG. 12B depicts a circuit implementation for generating a full-rate PRBS signal using a half-rate PRBS4 LFSR illustrated at 1202. The PRBS4 LFSR implementation includes four tap points that can be utilized in identifying candidate pairs of signals for combination. FIG. 12A identifies example patterns from which to select a candidate pair for generating a full-rate PRBS4 signal. A first four columns indicate signals produced by the four stages of the LFSR of FIG. 12B. The middle six columns identify additional patterns generated by performing an XOR or modulo 2 operation on pairs of signals acquired from the tap points of FIG. 12B. A candidate pair is identified as having a delay of $2^{K+L-1}=2^{4+1-1}=16$ full-rate cycles at DFF2 and (DFF0 XOR DFF2). The (DFF0 XOR DFF2) signal is delayed by one full full-rate clock cycle in the Step 2B column, and the DFF2 and the delayed (DFF0 XOR DFF2) are combined in the Step 3 column to generate the full-rate PRBS4 pattern. In the FIG. 12B circuit implementation, the (DFF0 XOR DFF2) signal is generated at 1204 and delayed by one full-rate clock cycle at 1206. It is combined at 1206 with the DFF2 signal via an XOR operation at 1208.

FIGS. 13-21 depict an example of generating a full-rate PRBSe signal using a quarter-rate clock. FIG. 13A indicates the difference between a full-rate signal in the left column and a quarter-rate signal in the right column, with the quarter-rate signal asserting each symbol of the pattern for four times as long. FIG. 13B indicates that four component quarter-rate signals are used to generate the full-rate signal, and L=2.

Figure 15:
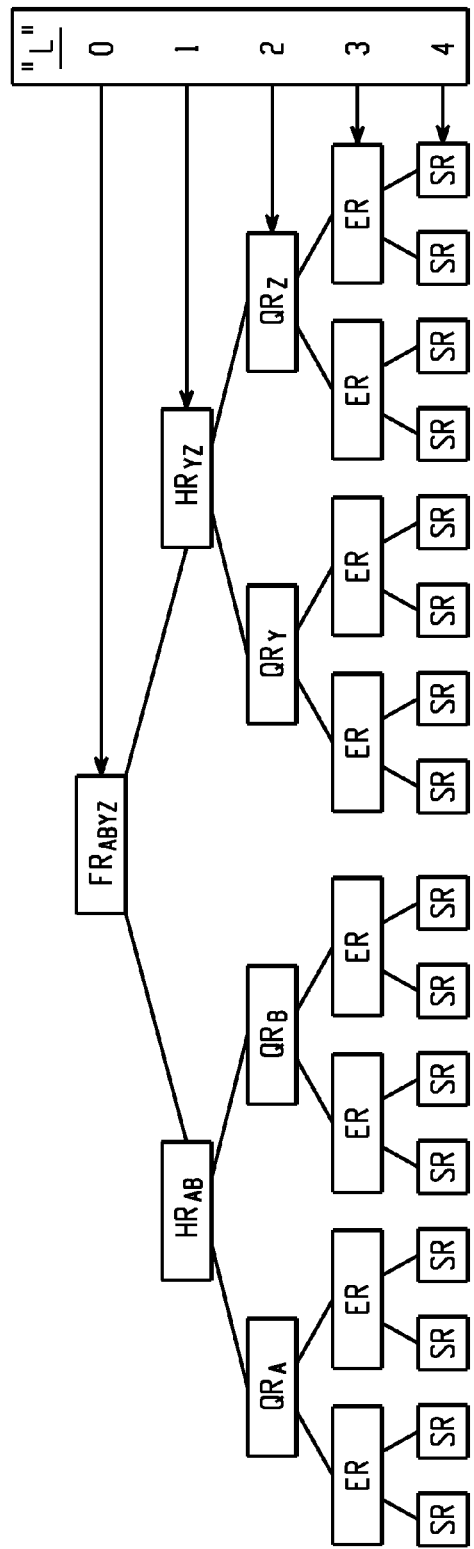
FIG. 15 indicates nomenclature for the component patterns that are generated in producing a full-rate PRBS signal ($FR_{ABYZ}$).
Figure 16A:
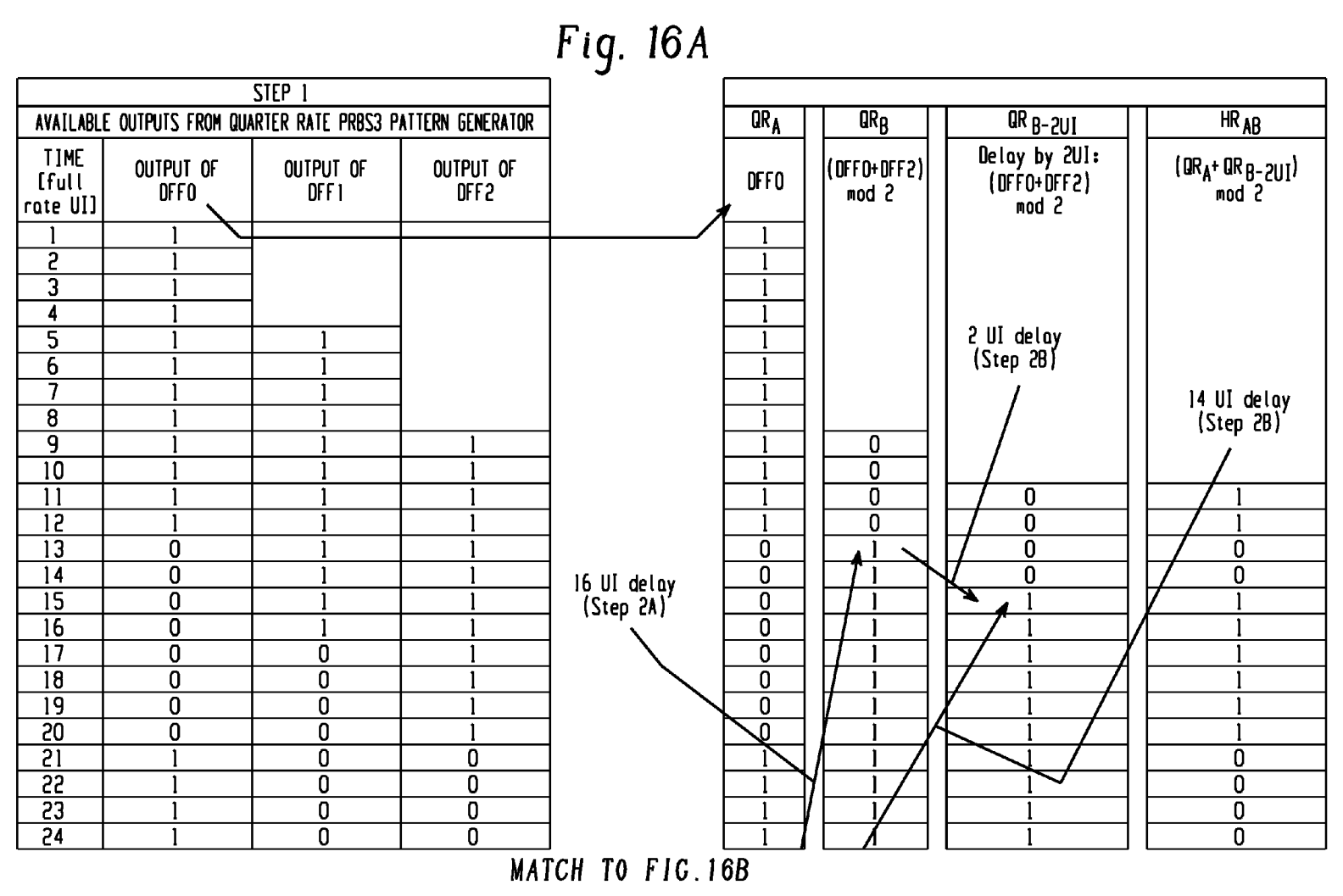
Figure 16B:
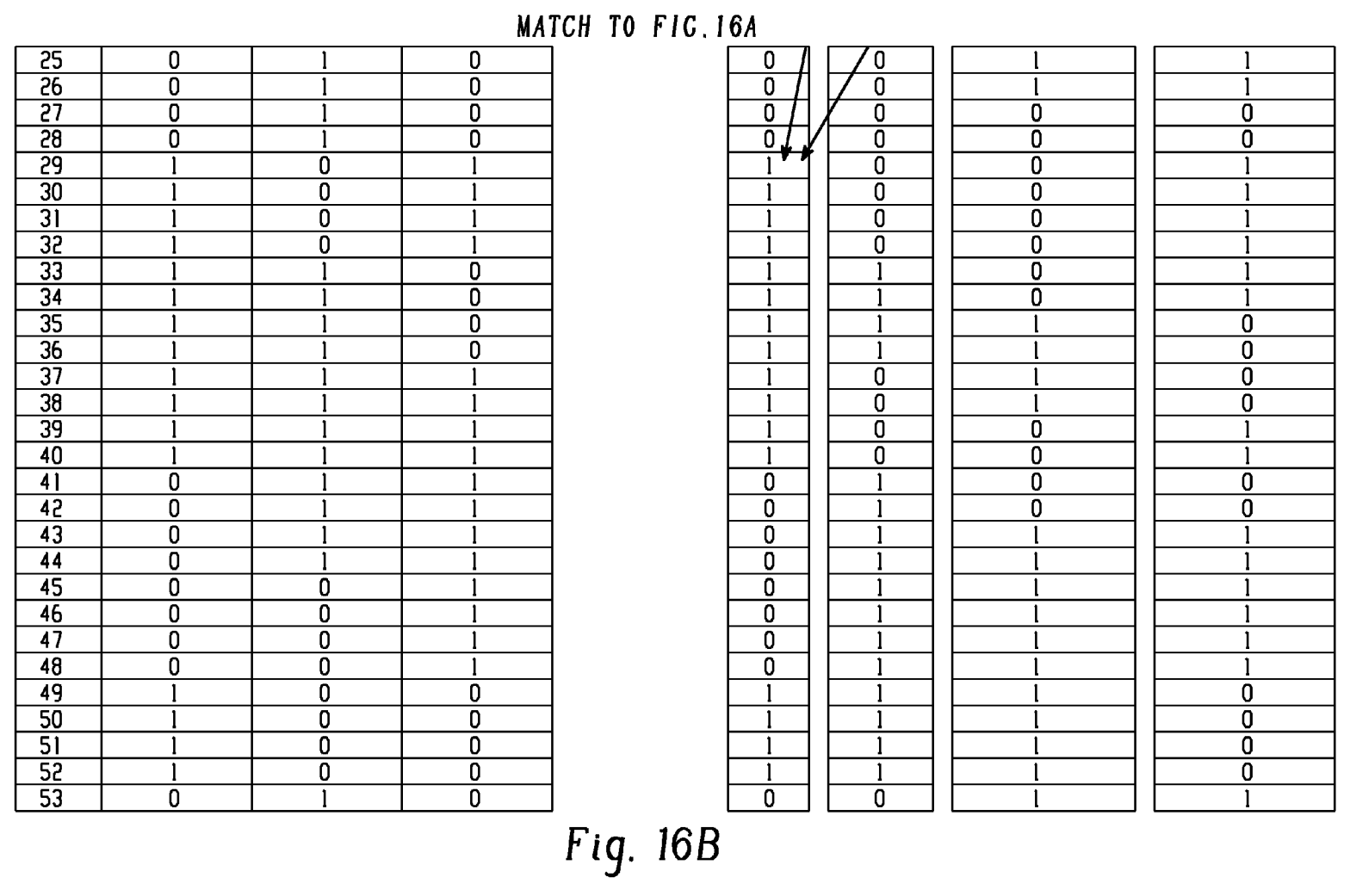

The full-rate signal is generated using a single LFSR operating using a quarter-rate clock signal. The LFSR is configured to output a pattern of "1110010" as a PRBS3 signal. FIG. 14 indicates the outputs of the three stages of the LFSR. FIG. 15 indicates nomenclature for the component patterns that are generated in producing full-rate PRBS signal ($FR_{ABYZ}$), with four quarter-rate signals ($QR_A$, $QR_B$, $QR_Y$, $QR_Z$) being generated and two half-rate PRBS signals $HR_{AB}$ and $HR_{YZ}$ being generated from those quarter-rate signals. For a PRBS3 signal, K=3, using a quarter-rate clock, L=2, tapped signals and signals generated by combining tapped signals are sought that have a relative delay of $2^{K+L-1}=2^{3+2-1}=16$; or $2^{K+L-1}-2^L=12$ full-rate units. FIG. 16 is a diagram depicting identification of a first quarter-rate signal candidate pair and generation of a corresponding half-rate signal. A match is found between DFF0 (referred to as $QR_A$) and (DFF0 XOR DFF2) (referred to as $QR_B$). The (DFF0 XOR DFF2) is delayed by one half-rate period (2 full-rate periods) and combined with the DFF0 ($QR_A$) to generate the $HR_{AB}$ signal indicated at the right column.

Figure 17B:
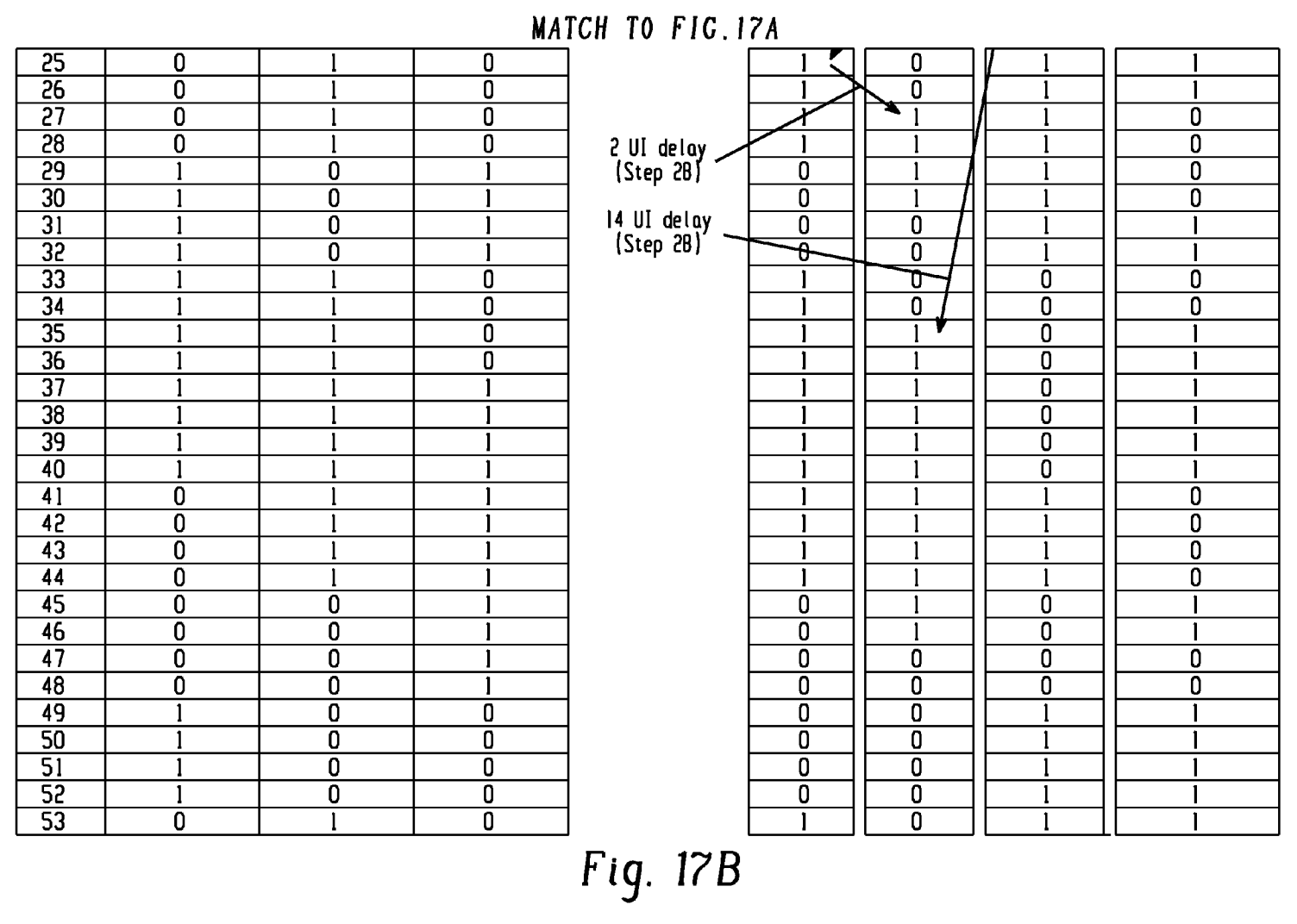

FIG. 17 is a diagram depicting identification of a second quarter-rate signal candidate pair and generation of a corresponding half-rate signal. A match is found between DFF1

(referred to as $QR_Y$) and (DFF0 XOR DFF1) (referred to as $QR_Z$). The DFF1 ($QR_Y$) signal is delayed by one half-rate period (2 full-rate periods) and combined with (DFF0 XOR DFF1) to generate the $HR_{YZ}$ signal indicated at the right column.

Figure 18A:
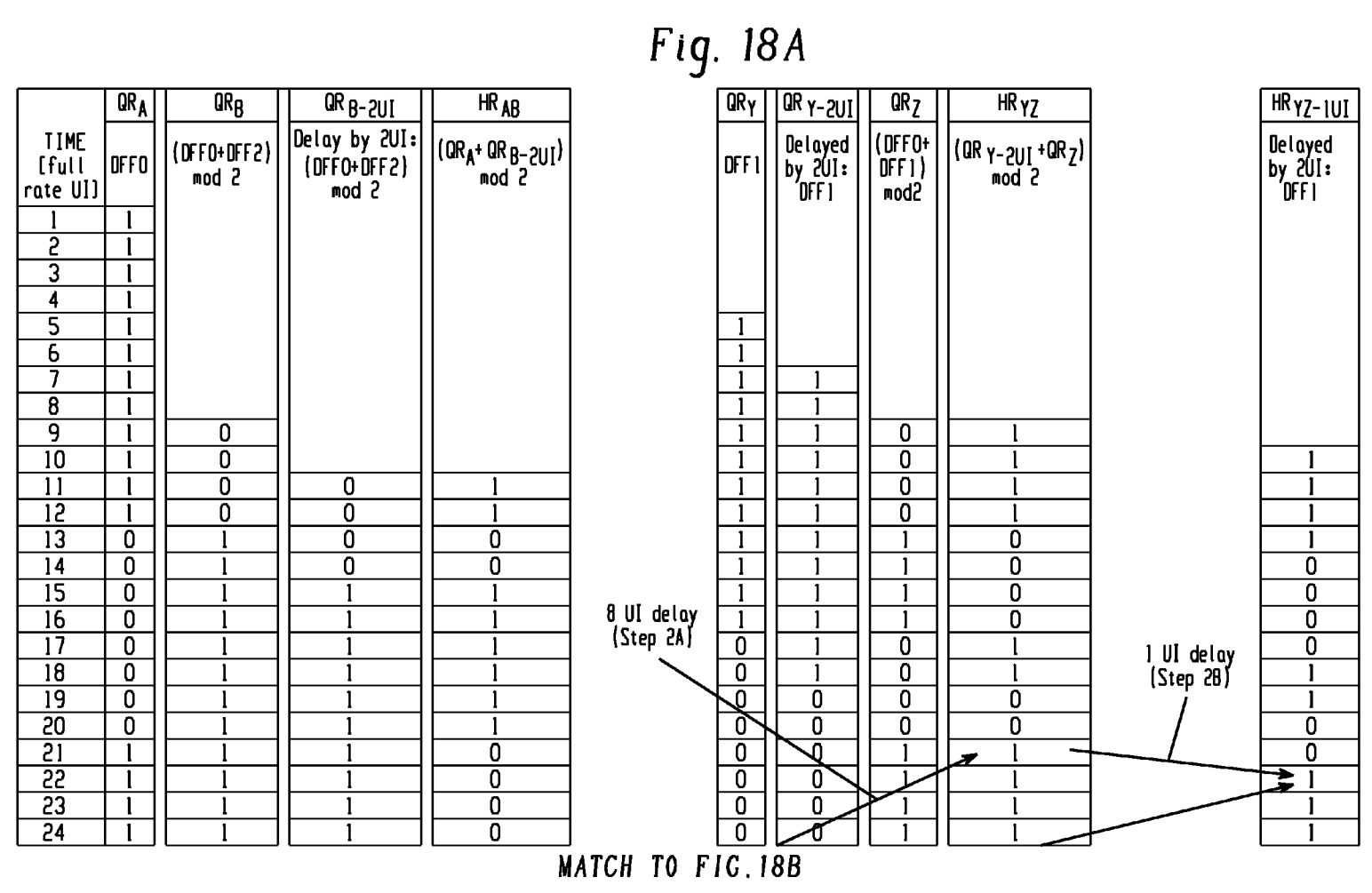
Figure 18B:
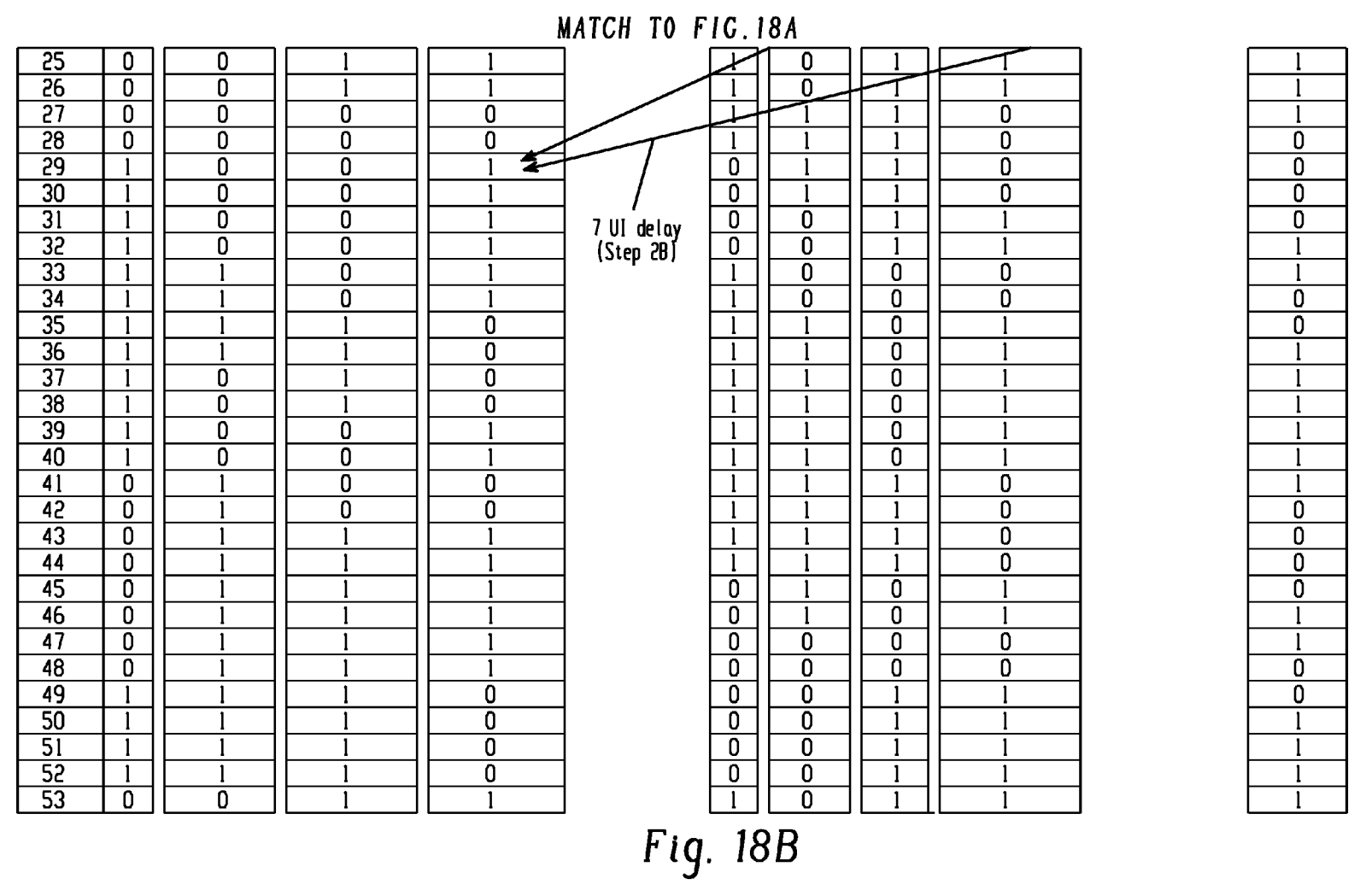
Figure 19A:
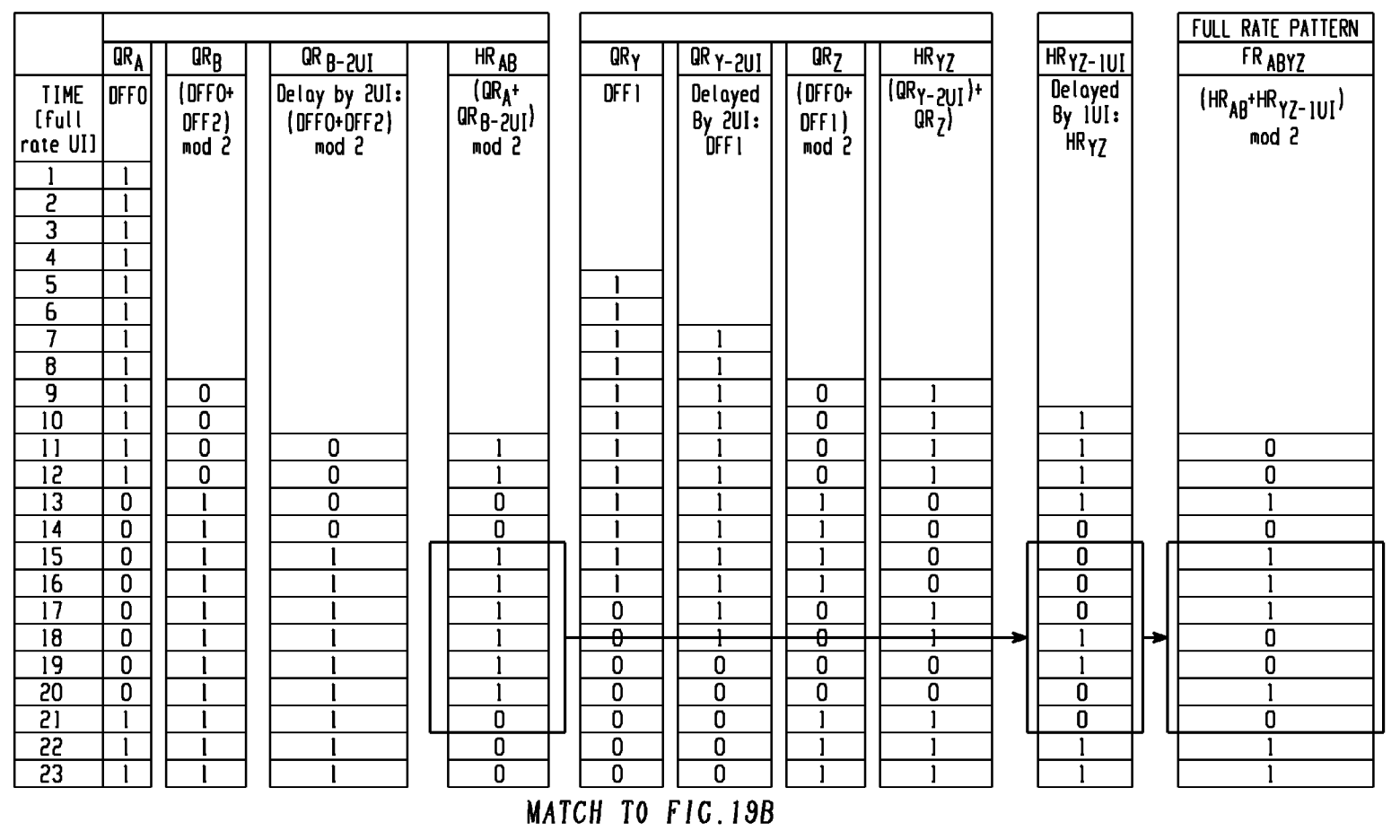
Figure 19B:
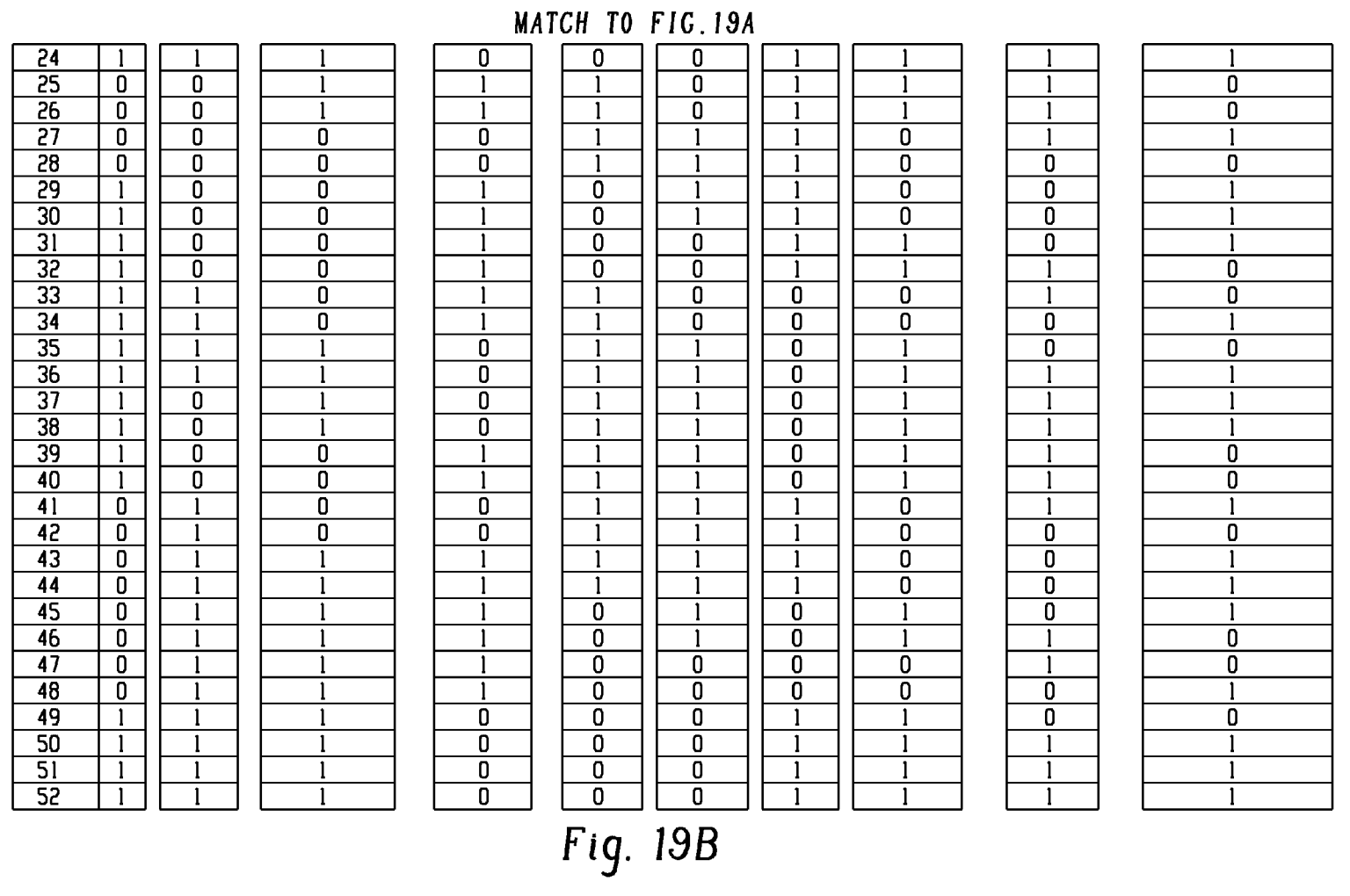

Now having 2 half-rate PRBS signals, those half-rate signals $HR_{AB}$ and $HR_{YZ}$ can be utilized to generate a full-rate PRBS signal. L is decremented by 1, such that L=2−1=1. FIG. 18 is a diagram depicting the desired relative delay between $HR_{AB}$ and $HR_{YZ}$ and the full-rate unit delay of the $HR_{YZ}$ signal. The sought after relative delay of $2^{K+L-1}=2^{3+1-1}=8$; or $2^{K+L-1}-2^L=6$ full-rate units is identified (8 units) between the $HR_{AB}$ and $HR_{YZ}$ signals. The $HR_{YZ}$ signal is delayed by one full-rate clock cycle to generate the delayed $HR_{YZ}$ signal. FIG. 19 depicts the XOR or modulo 2 combining of the $HR_{AB}$ and delayed $HR_{YZ}$ signals to generate the full-rate PRBS signal.

Figure 20:
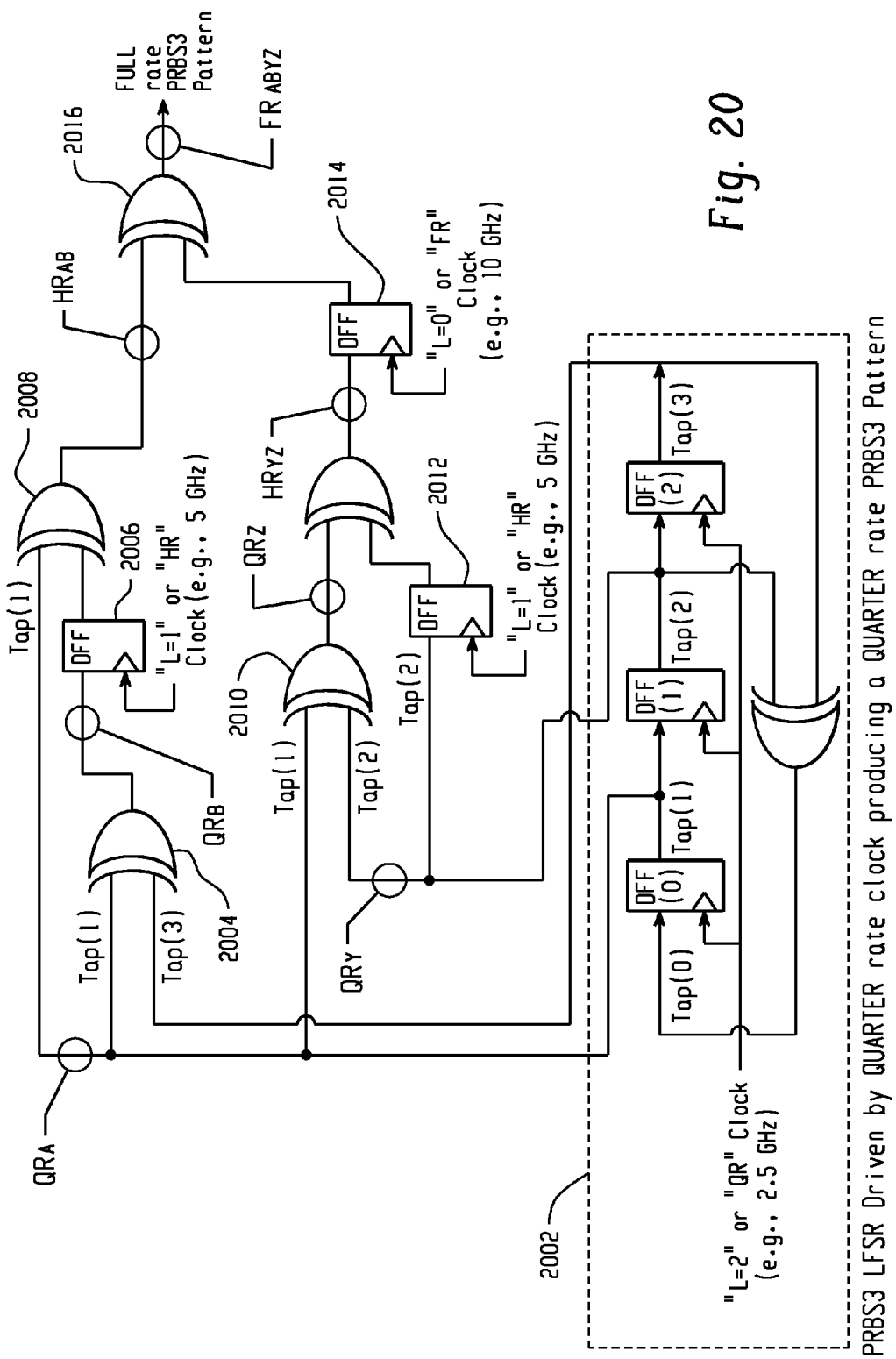
FIG. 20 depicts a circuit implementation of the logic developed in the example beginning at FIG. 13.

FIG. 20 depicts a circuit implementation of the logic developed in the example beginning at FIG. 13. A quarter-rate clock is supplied to an LFSR at 2002 that includes three tap points, DFF0, DFF1, DFF2. The $QR_A$ signal corresponds to the DFF0 signal. The $QR_B$ signal is generated at 2004 by combining the DFF0 signal and the DFF2 signal. That signal is delayed one half-rate unit at 2006 and combined with the $QR_A$ signal to generate the $HR_{AB}$ signal. The $QR_Z$ signal is generated at 2010 by combining the DFF0 and DFF1 signals. The $QR_Y$ signal corresponds to the DFF1 signal. That signal is delayed one half-rate unit at 2012 and combines with the $QR_Z$ signal to generate the $HR_{YZ}$ signal. The $HR_{YZ}$ signal is delayed one full-rate clock cycle at 2014 and that delayed signal is combined with $HR_{AB}$ at 2016 to generate the full-rate PRBS3 signal.

Figure 21:
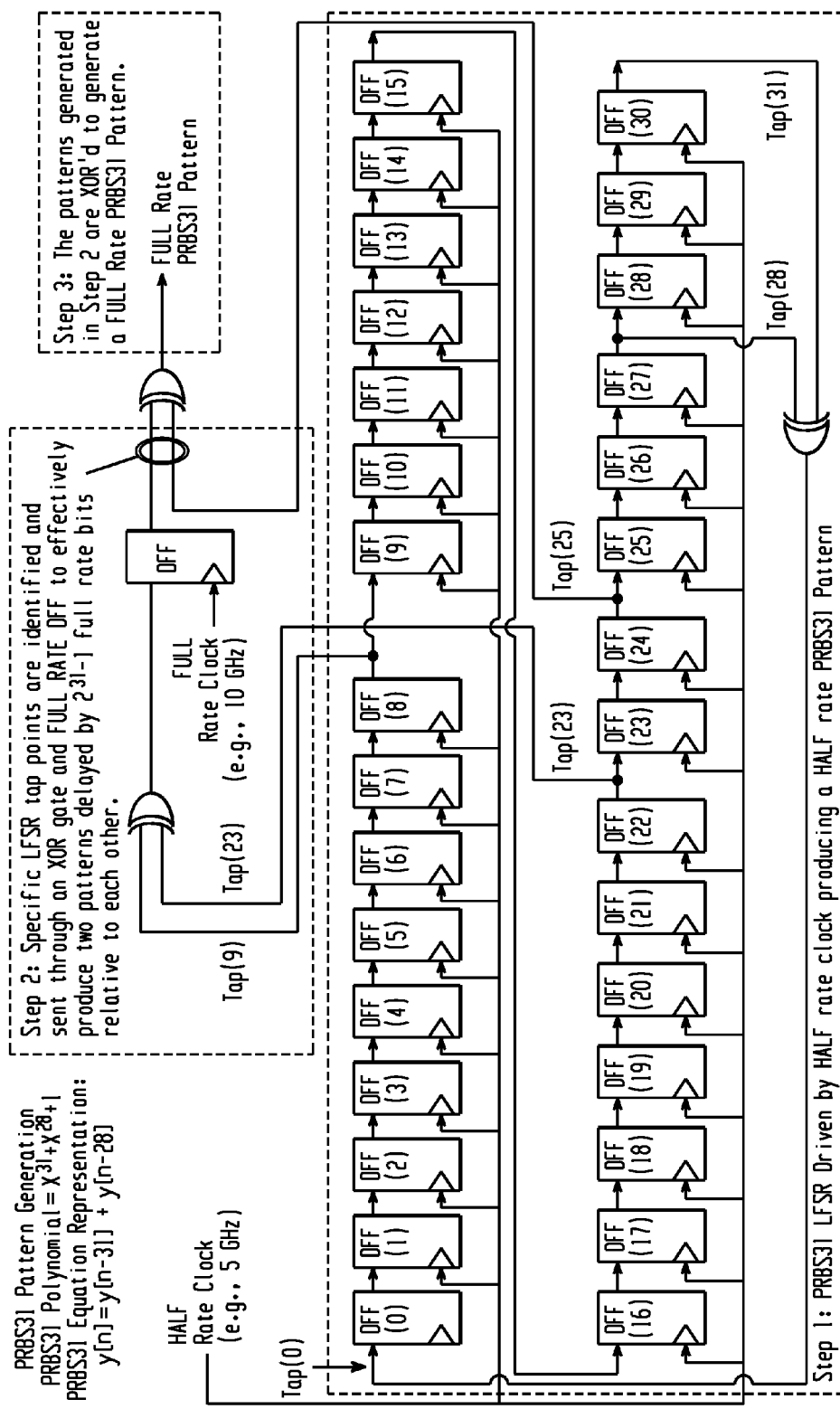
FIG. 21 depicts a circuit implementation of an example generation of a PRBS31 pattern using a half-rate clock according to the systems and methods described herein.
Figure 22A:
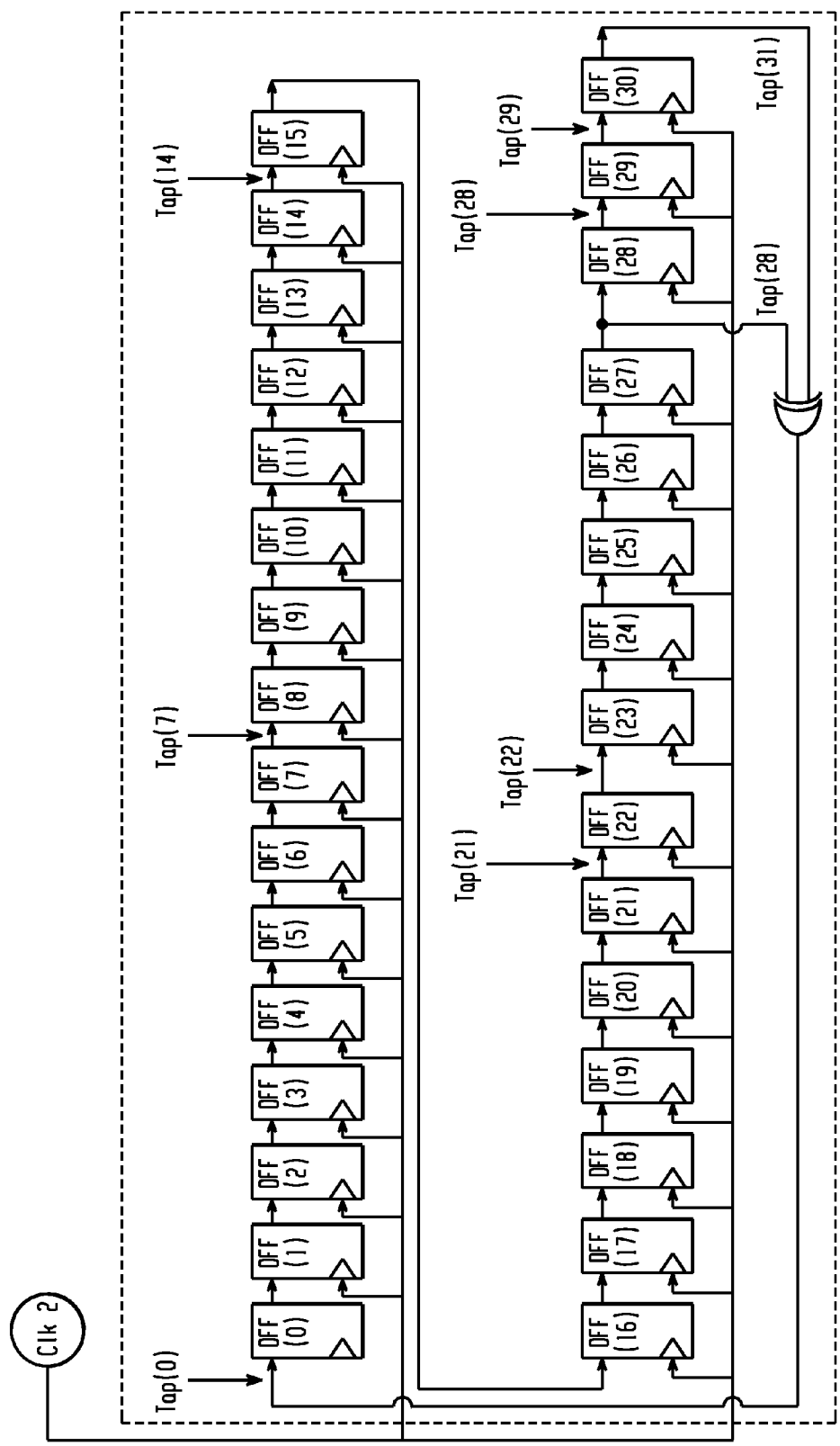
FIGS. 22A and 22B depicts a circuit implementation of an example generation of a PRBS31 pattern using a quarter-rate clock according to the systems and methods described herein.
Figure 22B:
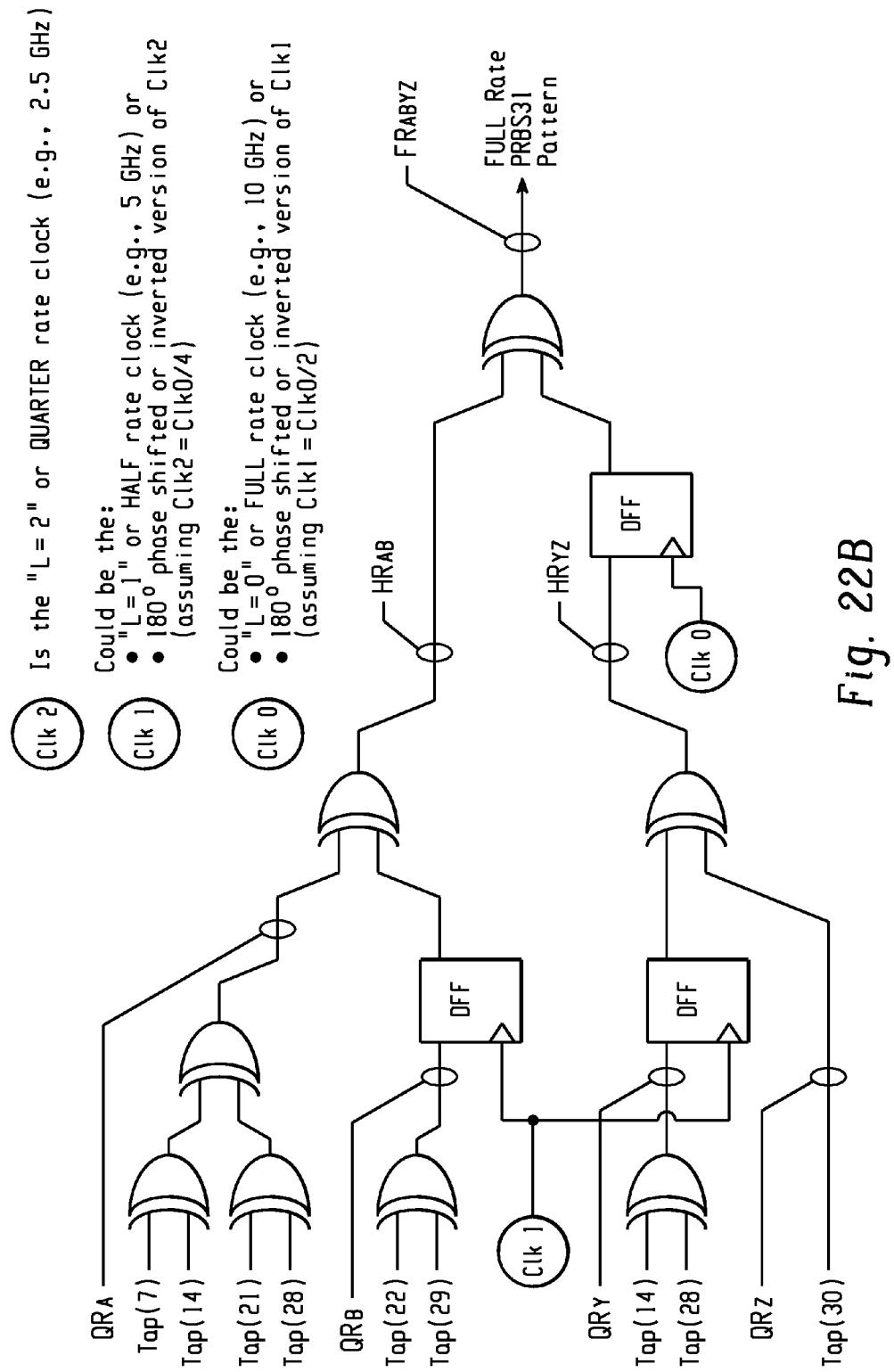

FIG. 21 depicts a circuit implementation of an example generation of a PRBS31 pattern using a half-rate clock according to the systems and methods described herein. FIG. 22 depicts a circuit implementation of an example generation of a PRBS31 pattern using a quarter-rate clock according to the systems and methods described herein.

Figure 23:
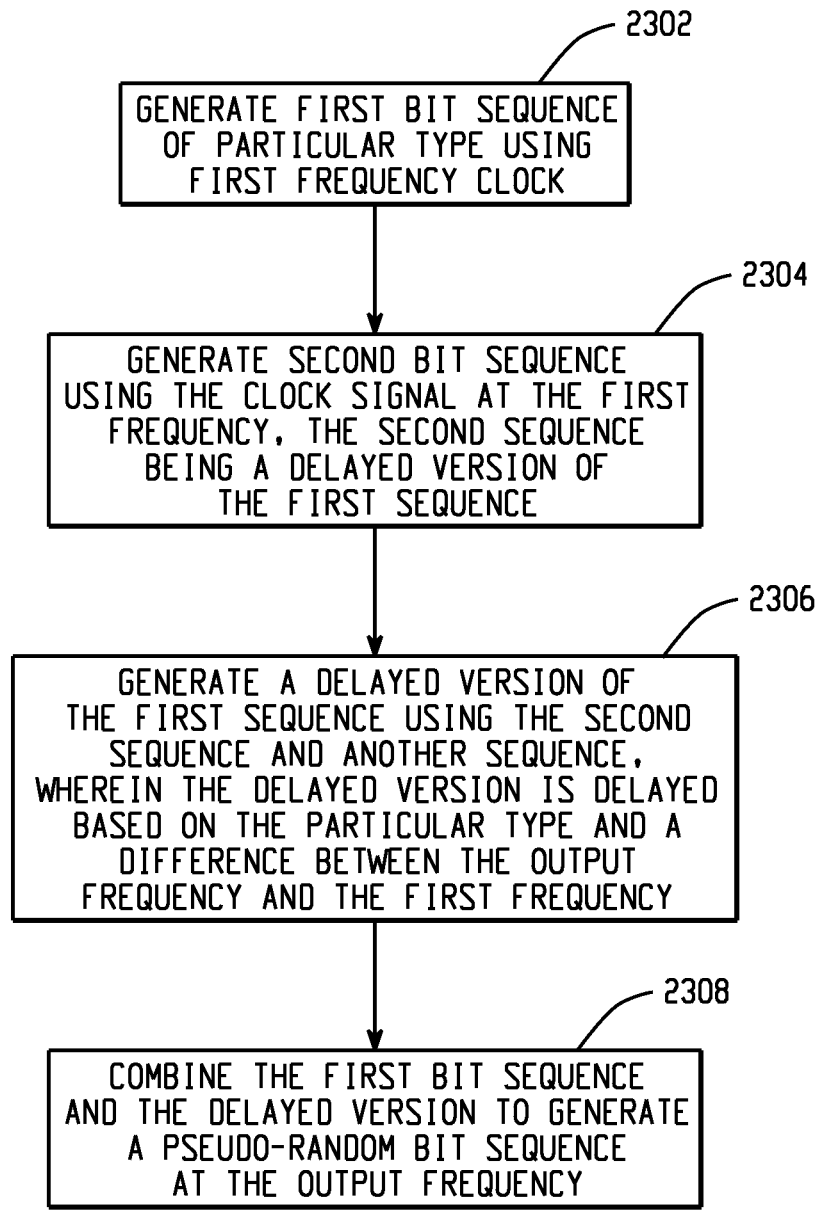
FIG. 23 is a flow diagram depicting a method for generating a pseudo-random bit sequence at an output frequency using a clock signal operating at a first frequency that is lower than the output frequency.

FIG. 23 is a flow diagram depicting a method for generating a pseudo-random bit sequence at an output frequency using a clock signal operating at a first frequency that is lower than the output frequency. At 2302, a first bit sequence of a particular type is generated using a clock signal operating at a first frequency. At 2304, a second bit sequence is generated using the clock signal operating at the first frequency, where the second bit sequence is a delayed version of the first bit sequence. At 2306, a delayed version of the first bit sequence is generated using the second bit sequence and another bit sequence, wherein the delayed version is delayed based on the particular type and a difference between the output frequency and the first frequency. At 2308, the first bit sequence and the delayed version are combined to generate a pseudo-random bit sequence at the output frequency.

Examples have been used herein to describe exemplary aspects of the invention, but the scope of the invention should not be limited thereto.

It is claimed:

1. A computer-implemented method of generating a pseudo-random bit sequence at an output frequency using a clock signal operating at a first frequency that is lower than the output frequency, comprising:

generating a first bit sequence of a particular type using a clock signal operating at a first frequency;

generating a second bit sequence using the clock signal operating at the first frequency, wherein the second bit sequence is a first delayed version of the first bit sequence;

generating a second delayed version of the first bit sequence using the second bit sequence and another bit sequence, wherein the second delayed version is delayed based on the particular type and a difference between the output frequency and the first frequency; and combining the first bit sequence and the second delayed version to generate a pseudo-random bit sequence at the output frequency.

2. The method of claim 1, further comprising:

delaying either the first bit sequence or the second delayed bit sequence by one cycle at the output frequency prior to performing the combining step.

3. The method of claim 1, wherein the another bit sequence is the first bit sequence.

4. The method of claim 1, wherein the second delayed version of the first bit sequence is generated based on an exclusive-or operation performed on the second bit sequence and the another bit sequence.

5. The method of claim 1, further comprising:

generating a plurality of component bit sequences based on combinations of two of: the first bit sequence, the second bit sequence, and other bit sequences consisting of delayed versions of the first bit sequence;

wherein the second bit sequence and the another bit sequence are selected from the component bit sequences to generate the second delayed version of the first bit sequence.

6. The method of claim 5, wherein the second bit sequence and the another bit sequence are selected based on their exclusive-or combination generating the second delayed version of the first bit sequence that is delayed by a predetermined amount, wherein the predetermined amount is based on the particular type and the difference.

7. The method of claim 1, wherein the first bit sequence and the second delayed version are combined via an exclusive-or operation.

8. The method of claim 1, further comprising:

generating a second pseudo-random bit sequence at the output frequency;

using the pseudo-random bit sequence and the second pseudo-random bit sequence to generate a third pseudo-random bit sequence at a frequency that is twice as fast as the output frequency.

9. The method of claim 8, wherein generating the third pseudo-random bit sequence comprises:

delaying the first pseudo-random bit sequence or the second pseudo-random bit sequence by one cycle of the frequency that is twice as fast as the output frequency; and combining the first pseudo-random bit sequence and the second pseudo-random bit sequence using an exclusive-or operation.

10. The method of claim 1, wherein the first bit sequence is generated using a delay circuit that includes K stages, wherein a value L is satisfies:

$$\text{output frequency} = \text{first frequency} * 2L;$$

wherein the second delayed version is delayed a particular time period that is calculated based on K and L.

11. The method of claim 10, wherein the second delayed version of the first bit sequence is delayed by:
   2K+L−1 or 2K+L−1−2L cycles at the output frequency.

12. The method of claim 10, wherein a first value of the pseudo-random bit sequence is output at the output frequency less than the particular time period after the start of generating the first bit sequence.

13. The method of claim 1, wherein the output frequency is 2N times faster than the first frequency.

14. A system for generating a pseudo-random bit sequence at an output frequency using a clock signal operating at a first frequency that is lower than the output frequency, comprising:
   a pseudo-random number generator operating at the first frequency, the pseudo-random number generator including a plurality of stages, a first bit sequence being output by a first stage, and a second bit sequence being output by a second stage, wherein the second bit sequence is a first delayed version of the first bit sequence;
   an exclusive-or circuit configured to generate a second delayed version of the first bit sequence using the second bit sequence and another bit sequence;
   a combining circuit configured to combine the first bit sequence and the second delayed version to generate a pseudo-random bit sequence at the output frequency.

15. The system of claim 14, further comprising:
   a delay circuit configured to delay either the first bit sequence or the second delayed bit sequence by one cycle at the output frequency prior to being provided to the combining circuit.

16. The system of claim 15, wherein the combining circuit comprises a second exclusive-or circuit.

17. The system of claim 14, wherein the pseudo-random number generator includes K stages, wherein a value L is satisfies:

output frequency=first frequency*2L;

wherein the second delayed version is delayed a particular time period that is calculated based on K and L.

18. The system of claim 17, wherein the second delayed version of the first bit sequence is delayed by:
   2K+L−1 or 2K+L−1−2L cycles at the output frequency.

19. The system of claim 16, wherein a first value of the pseudo-random bit sequence is output, at the output frequency, upon lapse of a second time period after the start of generating the first bit sequence, wherein the second time period is less than the relative delay by which the second delayed version is delayed relative to the first bit sequence.

20. The system of claim 14, wherein the output frequency is 2N times faster than the first frequency.

* * * * *